(12) United States Patent
Rhodes et al.

(10) Patent No.: US 8,873,147 B1
(45) Date of Patent: Oct. 28, 2014

(54) CHORD AUTHENTICATION VIA A MULTI-TOUCH INTERFACE

(75) Inventors: Bradley James Rhodes, Alameda, CA (US); Michael Patrick Johnson, Sunnyvale, CA (US); Sebastian Thrun, Los Altos, CA (US); Thad Eugene Starner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 215 days.

(21) Appl. No.: 13/315,225

(22) Filed: Dec. 8, 2011

Related U.S. Application Data

(60) Provisional application No. 61/510,021, filed on Jul. 20, 2011, provisional application No. 61/509,988, filed on Jul. 20, 2011.

(51) Int. Cl.
*G02B 27/14* (2006.01)
*G02B 27/01* (2006.01)

(52) U.S. Cl.
CPC ................... *G02B 27/0172* (2013.01)
USPC ......................................... 359/630

(58) Field of Classification Search
USPC ............. 359/13, 630, 632; 345/156, 157, 173
See application file for complete search history.

(56) References Cited

U.S. PATENT DOCUMENTS

| 8,203,502 B1* | 6/2012 | Chi et al. ........................... 345/7 |
| 2011/0169762 A1* | 7/2011 | Weiss ............................. 345/173 |
| 2011/0283241 A1 | 11/2011 | Miller et al. |

* cited by examiner

*Primary Examiner* — Mahidere Sahle
(74) *Attorney, Agent, or Firm* — McDonnell Boehnen Hulbert & Berghoff LLP

(57) ABSTRACT

Exemplary methods and systems involve chord-based authentication on a touch-based interface. An exemplary method may involve: (a) providing a user-interface on a touch-based interface of a computing device, wherein the user-interface comprises a plurality of input regions; (b) receiving input data corresponding to a plurality of touch interactions on the touch-based interface; (c) determining a sequence of chords from the input data, wherein each chord is defined by touch interaction with a certain combination of one or more of the input regions; (d) determining that the sequence of chords substantially matches a predetermined chord authentication sequence; and (e) responsive to the match, causing a computing device to make at least one function accessible.

21 Claims, 15 Drawing Sheets

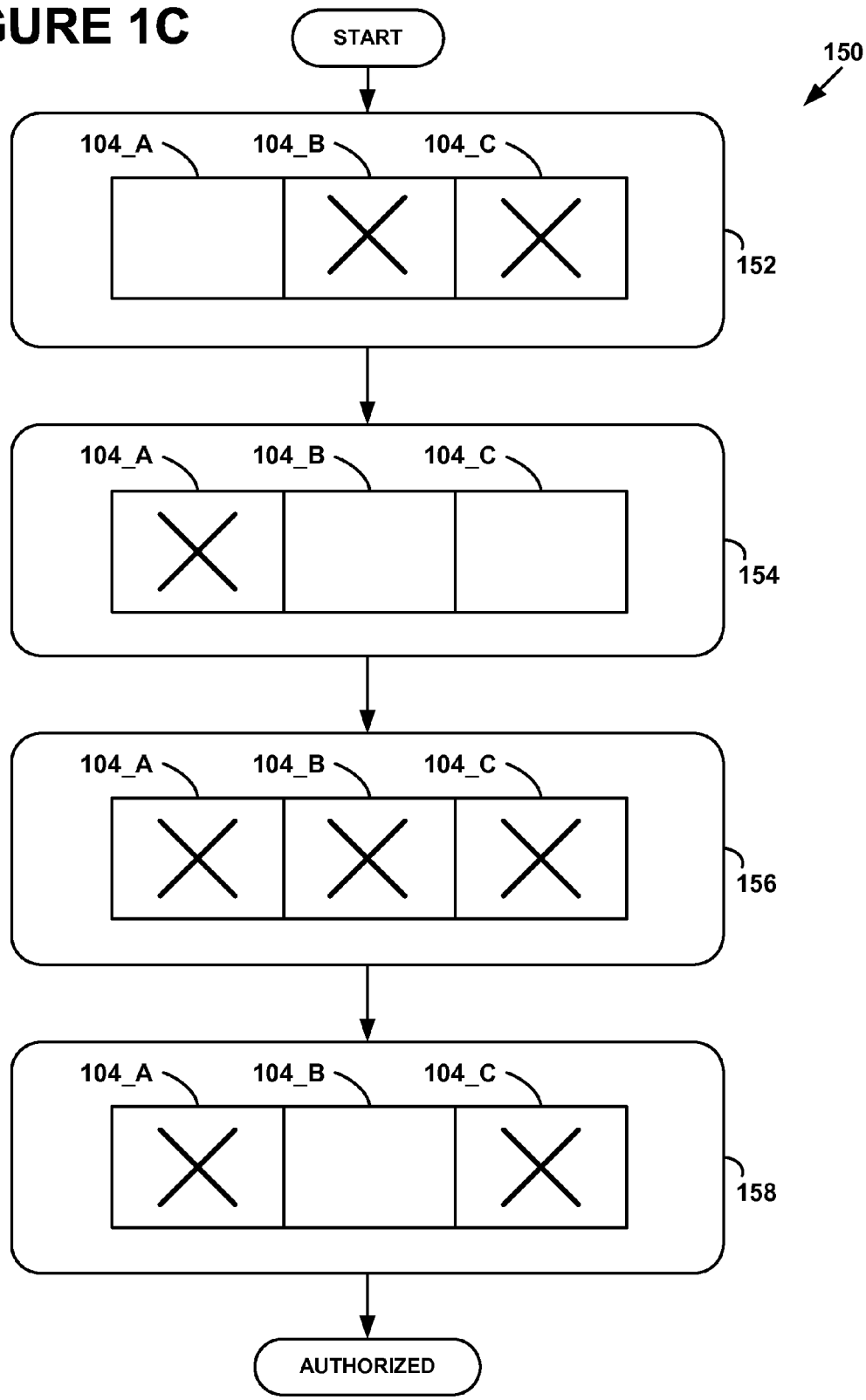

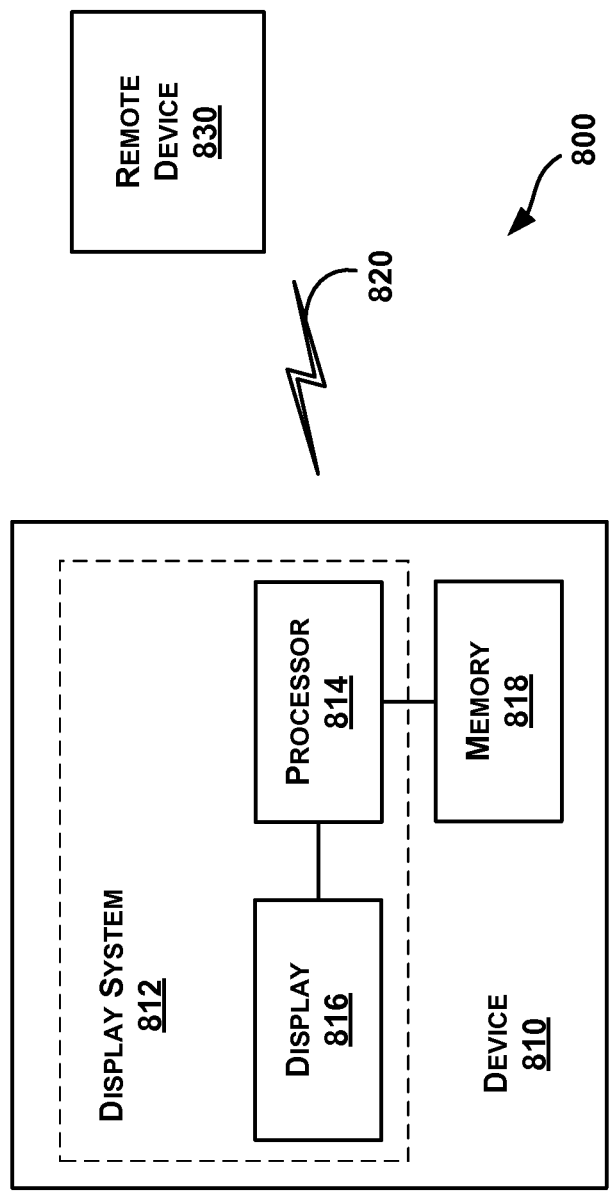

CHORD AUTHENTICATION VIA A MULTI-TOUCH INTERFACE

CROSS REFERENCE TO RELATED APPLICATIONS

This application claims priority to U.S. Provisional Application No. 61/510,021, entitled "Chord Authentication via a Multi-Touch Interface," filed on Jul. 20, 2011, and to U.S. Provisional Application No. 61/509,988, entitled "Edgerule Text Input on Touch Sensitive Screen", also filed on Jul. 20, 2011, which are both herein incorporated by reference for all purposes.

BACKGROUND

Existing computing devices employ various authentication techniques, which prevent unauthorized use of such devices and/or prevent unauthorized access to certain functions of such devices.

For example, a mobile phone may automatically enter a locked mode, where use of the phone is restricted, when the phone is not in use. A user may therefore be required to enter a password or passcode to unlock the phone. For example, the user may be presented with a 10-digit PIN number pad via which the user can enter a numeric passcode. On many current mobile phones, for instance, the user may be required to enter a predetermined four-digit number to unlock the phone.

SUMMARY

In one aspect, an exemplary computer-implemented method may involve a computing device: (a) providing a user-interface on a touch-based interface of a computing device, wherein the user-interface comprises a plurality of input regions; (b) receiving input data corresponding to a plurality of touch interactions on the touch-based interface; (c) determining a sequence of chords from the input data, wherein each chord is defined by touch interaction with a certain combination of one or more of the input regions; (d) determining that the sequence of chords substantially matches a predetermined chord authentication sequence; and (e) responsive to the match, causing a computing device to make at least one function accessible.

In another aspect, an exemplary wearable-computing-device system may include a non-transitory computer readable medium and program instructions stored on the non-transitory computer readable medium. The program instructions may be executable by at least one processor to: (a) provide a user-interface on a touch-based interface, wherein the user-interface comprises a plurality of input regions; (b) receive input data that corresponds to a plurality of touch interactions on the touch-based interface; (c) determine a sequence of chords from the input data, wherein each chord is defined by touch interaction with a certain combination of one or more of the input regions; (d) determine that the sequence of chords substantially matches a predetermined chord authentication sequence; and (e) responsive to the match, cause a computing device to make at least one function accessible.

In yet another aspect, an exemplary system may include: (a) means for providing a user-interface on a touch-based interface, wherein the user-interface comprises a plurality of input regions; (b) means for receiving input data corresponding to a plurality of touch interactions on the touch-based interface; (c) means for determining a sequence of chords from the input data, wherein each chord is defined by touch interaction with a certain combination of one or more of the input regions; (d) means for determining that the sequence of chords substantially matches a predetermined chord authentication sequence; and (e) means for responsive to the match, causing a computing device to make at least one function accessible.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 1C is a flow chart illustrating a sequence of chords that may be entered via the input regions shown in FIGS. 1A and 1B.

FIG. 8 illustrates a schematic drawing of a computing device according to an exemplary embodiment.

DETAILED DESCRIPTION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Overview

Exemplary embodiments involve authentication via a touch-based interface of a computing device. For instance, an exemplary embodiment may provide for authentication via a touch-based interface of a wearable computing device or a mobile phone that is multi-touch capable (e.g., capable of sensing touch from multiple fingers simultaneously).

More specifically, an exemplary embodiment may involve authentication via a sequence of touch-based "chords" on a touch-based interface. To allow a user to enter the chords, a number of input regions may be defined on the touch-based interface. A user may then enter each chord by touching a certain combination of one or more input regions.

Figure 1A:
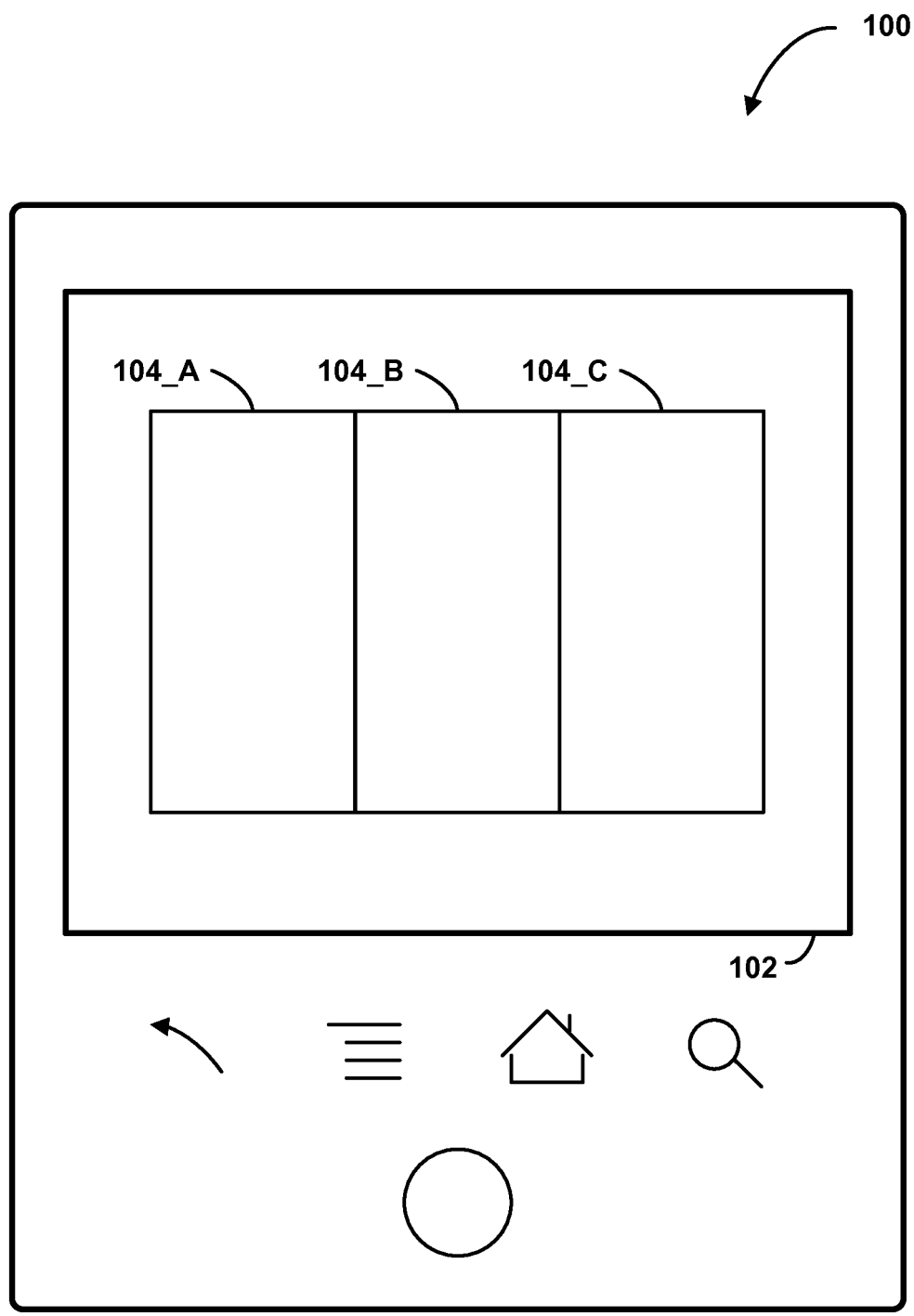
FIG. 1A is a simplified block diagram illustrating a chord-input interface, according to an exemplary embodiment.

For example, FIG. 1A is a simplified block diagram illustrating a chord-input interface, according to an exemplary embodiment. As shown, three input regions 104_A, 104_B, and 104_C may be defined on the touchpad 102 of mobile device 100. When mobile device 100 is in a locked mode, a user may take an action to bring up the input regions 104_A-104_C on touchpad 102 (e.g., hitting a button on mobile device 100, touching touchpad 102, or interacting with the device in some other manner). These input regions 104_A-104_C may thus allow a user to enter a sequence of chords by touching various combinations of one or more of the input regions, in order to unlock the mobile device 100.

Figure 1B:
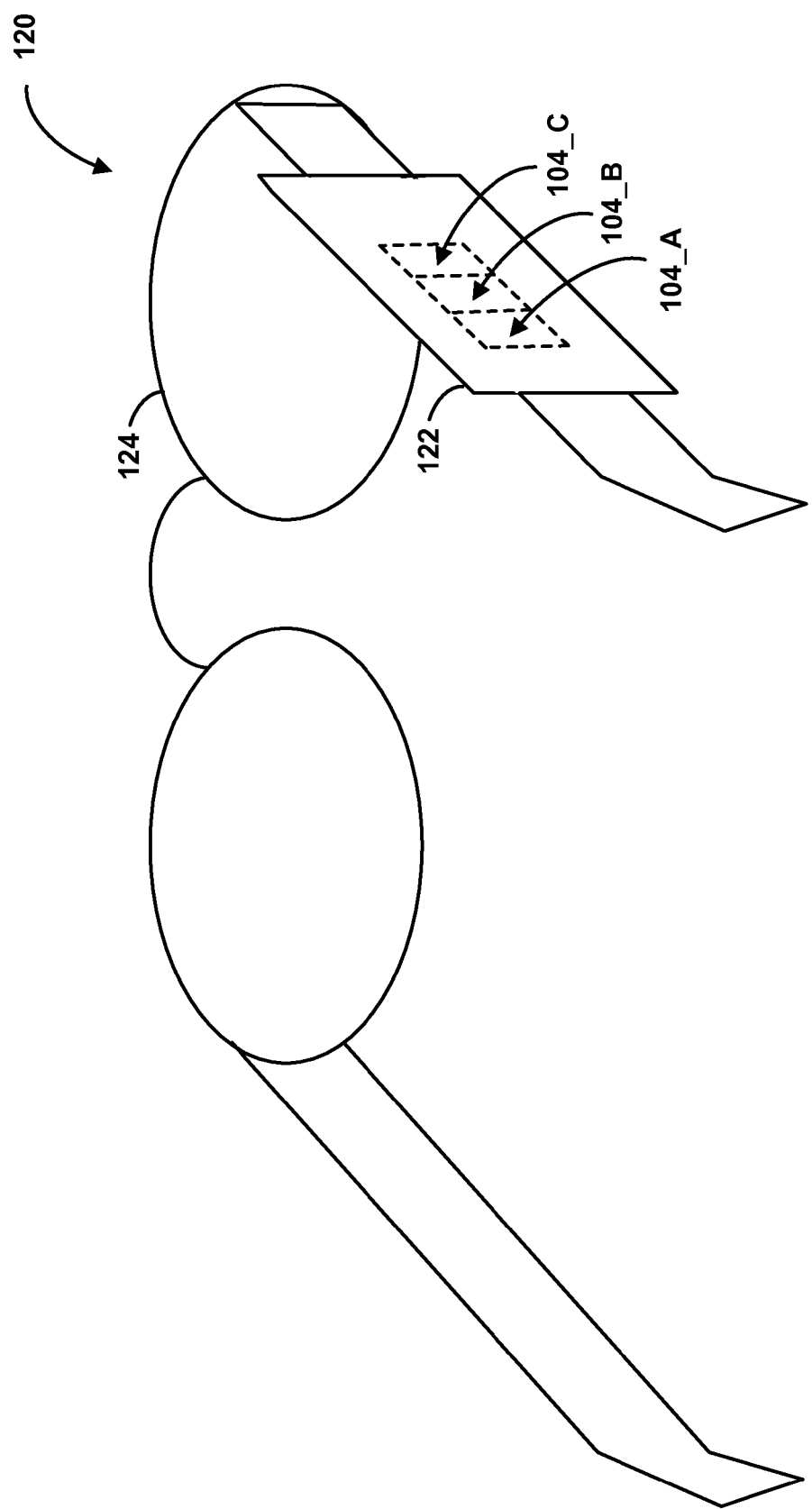
FIG. 1B is another simplified block diagram illustrating a chord-input interface, according to an exemplary embodiment.

FIG. 1B is another simplified block diagram illustrating a chord-input interface, according to an exemplary embodiment. In particular, FIG. 1B shows a head-mounted display (HMD) 120 having a side-mounted touchpad interface 122 which defines the same arrangement of input regions 104A-104C as are defined by the touchpad 102 of mobile device 100 in FIG. 1A.

In a further aspect of some embodiments the input regions 104_A to 104_C may be graphically displayed on the touch-based interface, in order to provide a visual cue for entry of chords. For instance, mobile device 100 may graphically display input regions 104_A to 104_C on touchpad 102.

It is also possible, however, that the input regions 104_A to 104_C will not be represented visually on the touch-based interface. For example, when HMD 120 is worn, the wearer will typically be unable to see the side-mounted touchpad interface 122. Accordingly, while the input-regions may be defined on the side-mounted touchpad interface 122, they may be invisible to an observer. In such an embodiment, a representation of the input regions may instead be displayed in a display of the HMD. Further, the HMD may display graphics that indicate when a user is touching a given input region (e.g., an "x" or a dot within a shape that represents the input region).

FIG. 1C is a flow chart illustrating a sequence of chords that may be entered via the input regions shown in FIGS. 1A and 1B. The sequence 150 of chords shown in FIG. 1B includes four chords. In particular, a user may enter the first chord 152 in sequence 150 by touching input regions 104_B and 104_C simultaneously. Next, user may enter the second chord 154 in sequence 150 by touching only input region 104_A. The user may then enter the third chord 156 in sequence 150 by touching all three input regions 104_A, 104_B, and 104_C simultaneously. The user may then enter the fourth chord 158 in the sequence 150 by touching input regions 104_A and 104_C simultaneously.

When mobile device 100 or wearable computing device 120 detects sequence 150, the device may determine whether the sequence matches a predetermined chord authentication sequence. If a match is detected, then the device may unlock itself.

Other interfaces for authentication, such as those using a numeric passcode on a 10-digit PIN interface, which is typically laid out in a 4×3 grid, may have certain drawbacks. For example, when a numeric passcode is entered via a 10-digit PIN interface, this requires that the user memorize the numeric passcode in order to unlock the device. This may be undesirable, as users may already have a number of such numeric passcodes for various purposes (e.g., ATM pin codes), and thus resort to using poor passwords such as "1234" or a number such as their birthday (e.g., 0615 for a June 15$^{th}$ birthday) or the street number from their home address. Further, someone who watches a user enter a numeric passcode on a 10-digit PIN interface, one digit at a time, may be able to discern the user's passcode. This problem may be exacerbated in the context of an HMD with a side-mounted touchpad, where it may be difficult to avoid entering the passcode in plain view to other people nearby.

Chord-based authentication according to an exemplary embodiment may provide a number of advantages. For instance, since the chords are not numeric or text-based, the tendency of individuals to pick poor passwords may be averted. Further, because chords can involve multi-touch input, because input regions can be touched more than once during a sequence of chords, and/or because use of multiple fingers to enter chords makes it difficult for someone else to distinguish which finger or fingers are touching the interface at a given point in time, it may be difficult for others to learn a user's chord authentication sequence by simply watching the user enter the sequence. This benefit may be particularly useful when chord-based authentication is implemented on a wearable computer having an HMD with a side-mounted touchpad, as it may provide security in situations where a user enters their chord authentication sequence in view of other people. Other benefits are also possible. However, it should be understood that the possible benefits described herein should not be construed as limiting the scope of the invention.

It should be further understood that while the above examples generally involve a mobile device and/or a wearable computer, an exemplary embodiment may be implemented by any computing device that includes or has access to touch-based interface that is multi-touch capable. Further, an exemplary embodiment may help provide authentication in many different scenarios, other than the unlocking of a device described in reference to FIGS. 1A-1C.

II. Exemplary Methods

Figure 2:
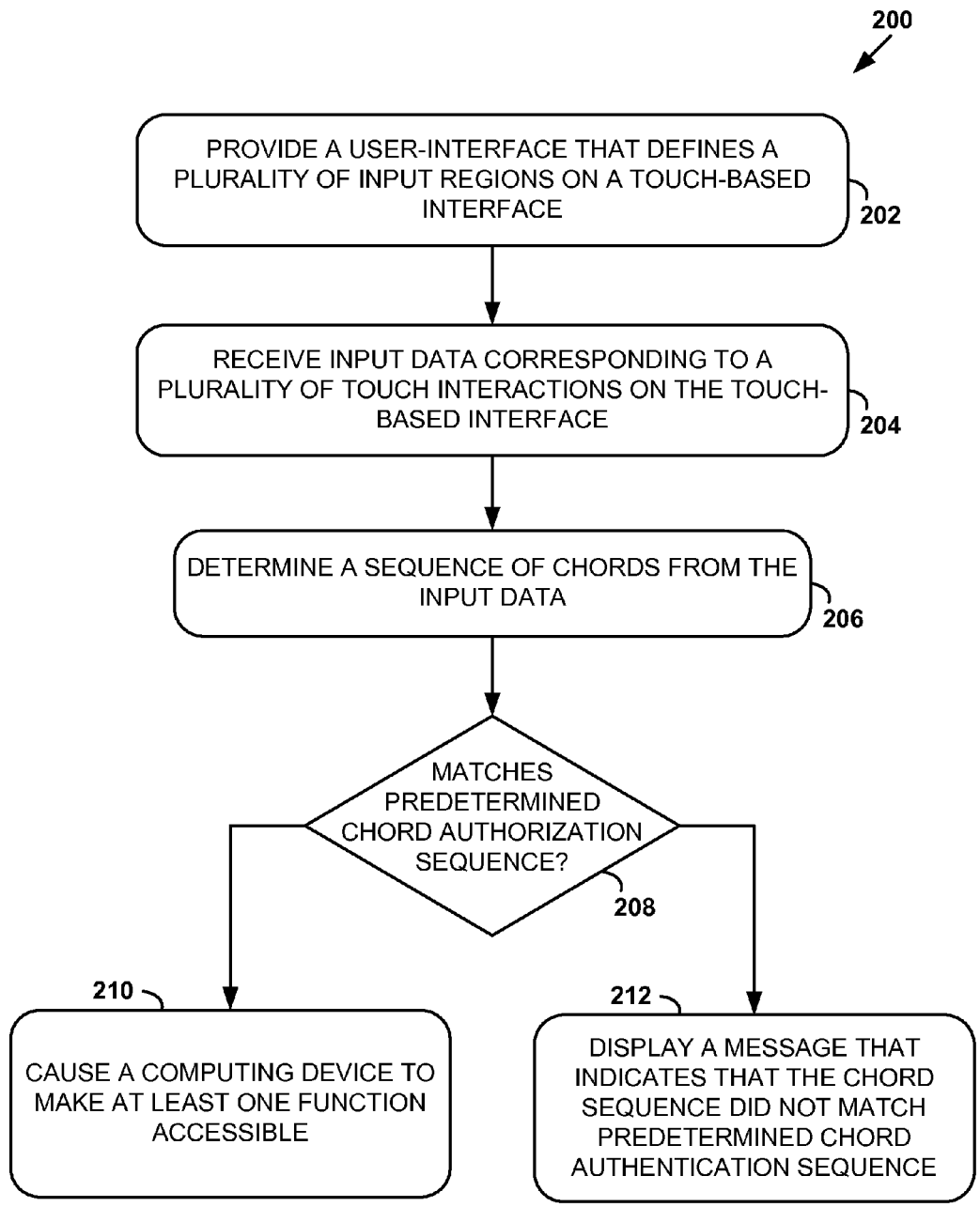
FIG. 2 is a flow chart illustrating a method according to an exemplary embodiment.

FIG. 2 is a flow chart illustrating a method according to an exemplary embodiment. While method 200 of FIG. 2 is described by way of example as being carried out by a wearable computing device, it should be understood that exemplary methods such as method 200 may also be carried out by other types of computing devices. In particular, an exemplary method may generally be implemented for authentication purposes in any device or system that includes or has access to a touch-based interface. For example, an exemplary method may be implemented by devices and/or systems such as a mobile phone, a personal computer, a tablet computer, a television monitor, an ATM screen, a touchpad at a retail sale point, and/or a car-door lock, among others.

Method 200 involves a wearable computing device providing a user-interface that defines a plurality of input regions on a touch-based interface, as shown by block 202. The wearable computer also receives input data corresponding to a plurality of touch interactions on the touch-based interface, as shown by block 204. The wearable computer may then determine a sequence of chords from the input data, as shown by block 206. Next, the wearable computer may determine whether or not the sequence of chords substantially matches a predetermined chord authentication sequence, as shown by block 208. If the sequence of chords substantially matches a predetermined chord authentication sequence then the wearable computer causes a computing device to make at least one function accessible, as shown by block 210. Otherwise the, wearable computer may take an alternative action, such as displaying a message that indicates that the chord sequence did not match predetermined chord authentication sequence, as shown by block 212.

In an exemplary embodiment, each chord may be defined by a plurality of touch indications, including a touch indication corresponding to each of the input regions on the touch-based interface. The touch indication for a given input region may be a binary signal that indicates whether or not a touch was detected in the given input region. Therefore, each chord may be defined by the combination of the touch indications from all the input regions defined on the touch-based interface. For example, referring to chord 152 of FIG. 1C, the chord may be defined by receipt of: (i) a first touch indication corresponding to input region 104_A which indicates that no touch occurred in input region 104_A, (ii) a second touch indication corresponding to input region 104_B which indicates that a touch occurred in input region 104_B, and (iii) a third touch indication corresponding to input region 104_C which indicates that a touch occurred in input region 104_C. Other examples are also possible.

In one exemplary application, method 200 may be used to provide an unlock function for a wearable computer or another type of computing device (e.g., a mobile phone or tablet computer). In such an application, the wearable computer makes at least one of its own functions accessible in block 208.

However, in block 208, the wearable computer may additionally or alternatively cause another device or multiple other devices to make at least one function accessible. For example, in block 208, the wearable computer could coordinate a mobile phone associated with the same user as the wearable computer and instruct the mobile phone to unlock. As additional examples, in block 208, the wearable computer could: (a) communicate with an in-car computer to cause the car's door to unlock, (b) or communicate with a computing system to cause a garage door to open, and/or (c) communicate with a television and/or a television receiver to cause the television and/or the television receiver to power on. Many other examples are also possible.

A. Exemplary Input Regions

In an exemplary embodiment, the input regions may take the form of "buttons" or "keys," which may be graphically displayed on a touch-based interface. In some embodiments, such input regions may each be displayed with a different color. However, the graphic representation of the input regions may vary in color, size, and/or shape without departing from the scope of the invention. Further, it is possible that a touchpad interface will not display graphics corresponding to the input regions. Such an embodiment may be useful in the context of an HMD with side-mounted touchpad, where the user typically cannot see the touchpad as they are entering chords and displaying a blank screen or some other unrelated graphics may help provide security during entry of chords.

i. Input Region Arrangements

Further, in an exemplary embodiment, three input regions may be arranged in a horizontal arrangement, such as is illustrated by input regions 104_A-104_C of FIGS. 1A and 1B. With this arrangement a user may place their index, middle and ring fingers over the input regions, with one finger over each input region, and enter a chord by touching one or more of the input regions.

Many other arrangements of the input region are possible. For example, the number of input regions may vary. In particular, more or less than three input regions may be defined in order to increase or decrease the chord length, respectively.

Further, the number and/or the placement of the input regions may be specifically designed to facilitate entry of chords by a left-handed user or by a right-handed user. Additionally or alternatively, the number and/or the placement of the input regions may be designed to facilitate entry of chords with both hands at once.

Further, the single row of input regions may be arranged vertically or horizontally. In addition, a computing device may switch between a vertical and horizontal orientation depending on how the user wants to hold the device when they enter the code. In some embodiment, the switch can be based on one or more orientation sensors of the device. For example, a mobile phone or tablet computer may display input regions in a horizontal arrangement when the phone or tablet is held in a portrait orientation, such as is illustrated by input regions 104_A-104_C in FIG. 1A. However, if such a phone or tablet is rotated and held in a landscape orientation, the phone or tablet may switch to a vertical arrangement of the input regions (so that from the perspective of the user that has rotated the phone or tablet, the arrangement of the input regions appears to be the same in portrait and landscape orientation).

Figure 3A:
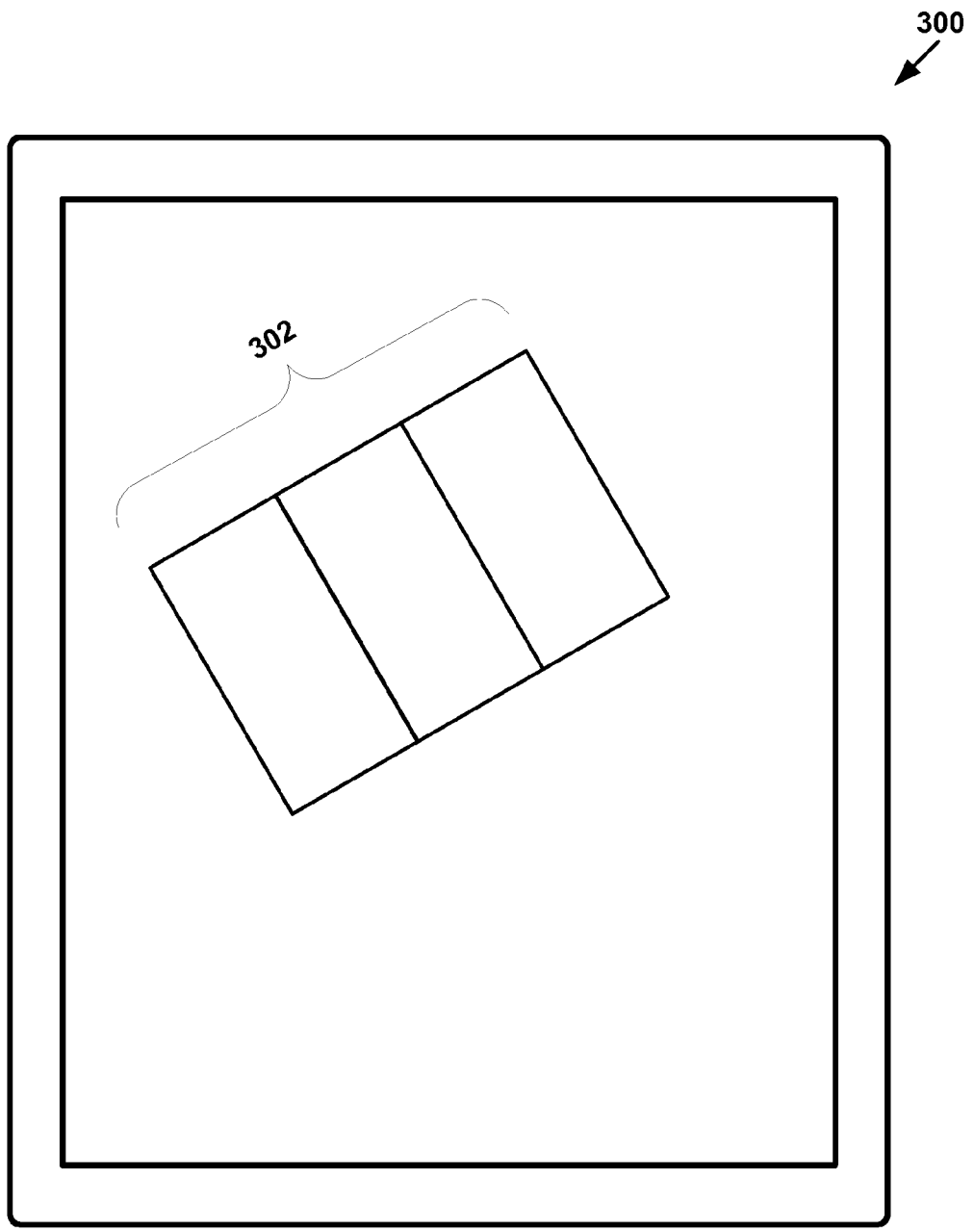
FIG. 3A illustrates a diagonal arrangement of input regions, according to an exemplary embodiment.

Further, in some embodiments, the input regions may be displayed in a diagonal arrangement. For example, FIG. 3A illustrates a diagonal arrangement of input regions, according to an exemplary embodiment. In particular, FIG. 3A shows a chord-based unlock screen of a tablet computer 300 in which input regions 302 are arranged diagonally.

Figure 3B:
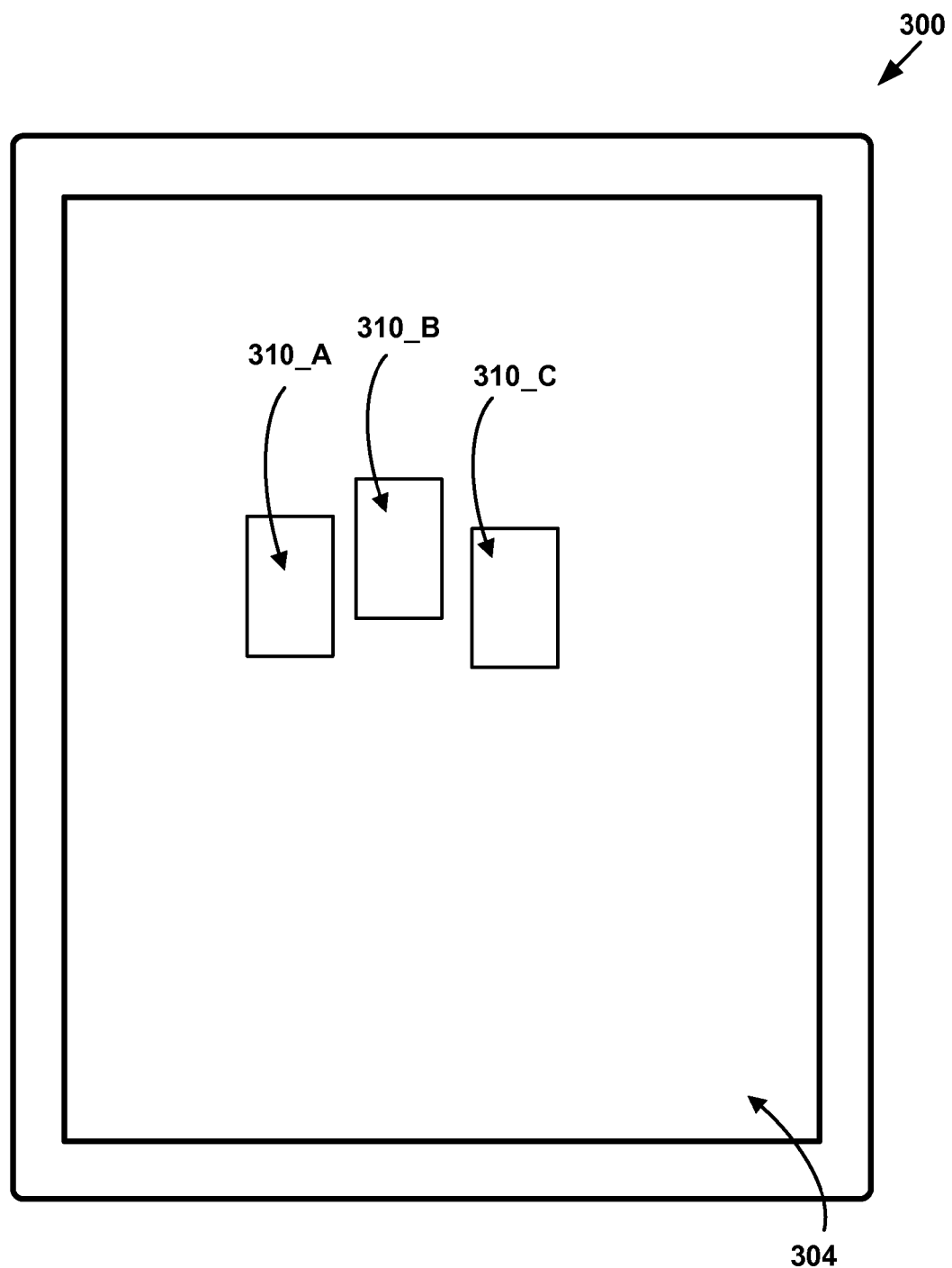
FIG. 3B illustrates a non-linear arrangement of input regions, according to an exemplary embodiment.

In another aspect, while input-region arrangements illustrated in FIGS. 1A-1C and FIG. 3A all involve a linear arrangement (e.g., a single row) of input regions, non-linear input-region arrangements are also possible. For example, FIG. 3B illustrates a non-linear arrangement of input regions, according to an exemplary embodiment. In particular, FIG. 3B shows a chord-based unlock screen of a tablet computer 300 in which input regions 310_A, 310_B, and 310_C are arranged in a non-linear layout. Other non-linear arrangements of input regions are also possible.

Yet further, while input regions are illustrated in FIGS. 1A-1C and FIG. 3A as being adjacent, with no space separating the input regions, other embodiments may involve touch-based interfaces that define input regions that are spaced apart from one another. For example, input regions 310_A, 310_B, and 310_C are spaced apart from one another on the touch-based interface 304 of tablet 300, such as in FIG. 3B.

ii. Adaptive Input-Region Location

In a further aspect, a computing device may locate the input regions around the location or the area of an initial touch interaction on a touchpad. Accordingly, an exemplary method may further involve a computing device detecting an initial touch interaction on the touch-based interface. The computing device may then determine where to locate the input regions based on the initial touch interaction. Various different techniques for locating the input regions based on an initial touch interaction are possible.

Figure 4A:
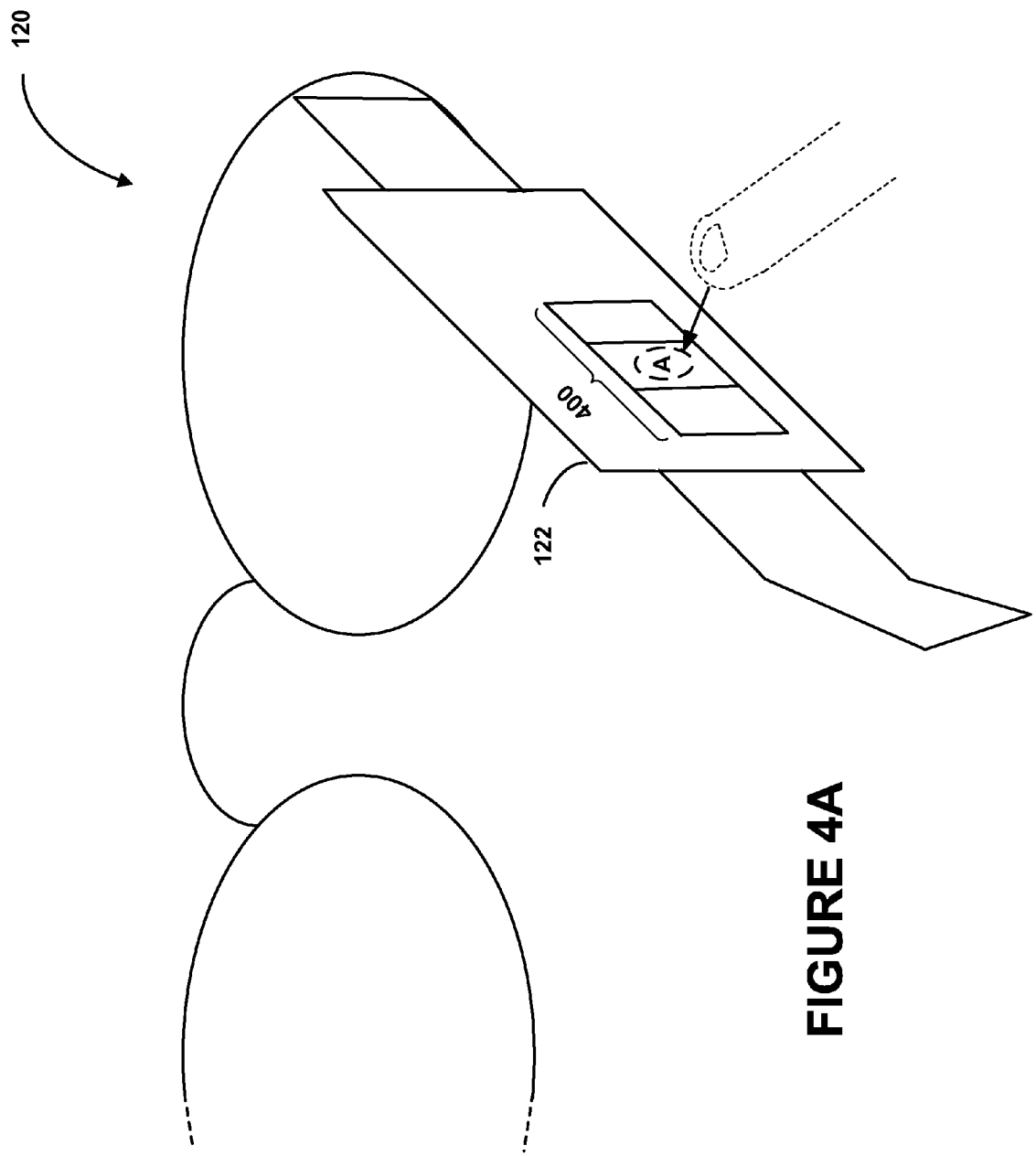
FIG. 4A is a block diagram illustrating an initial touch interactions on a touch-based interface, according to an exemplary embodiment.
Figure 4B:
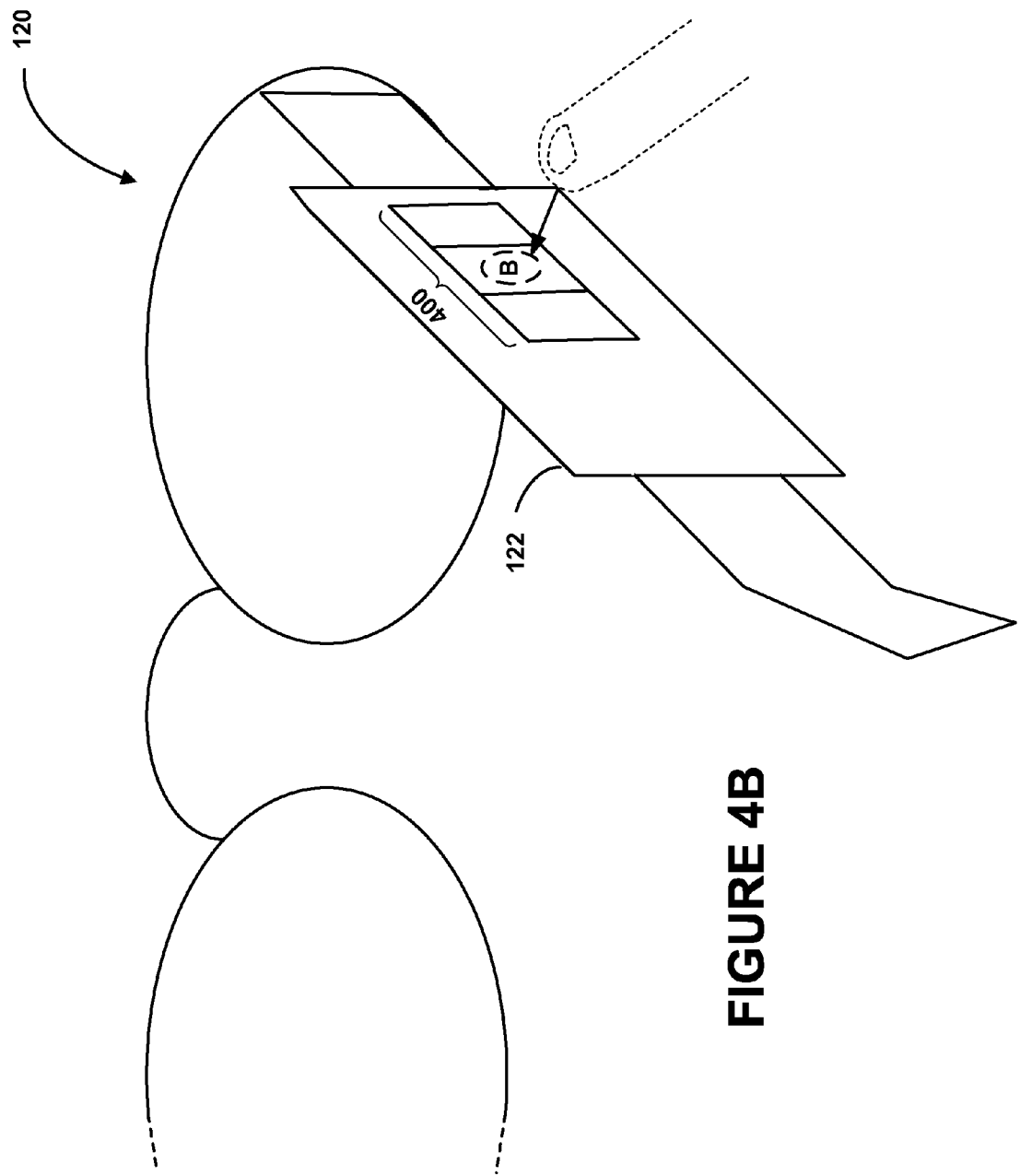
FIG. 4B is another block diagram illustrating an initial touch interaction on a touch-based interface, according to an exemplary embodiment.

For example, FIGS. 4A and 4B are block diagrams illustrating initial touch interactions on a touch-based interface, according to an exemplary embodiment. FIG. 4A shows a finger 402 touching touchpad 122 of an HMD 120 at location A. In the illustrated embodiment, the HMD is configured to center the input regions at a location of the initial touch interaction. Thus, in the scenario shown in FIG. 4A, input regions 408 are centered on location A on touchpad 122.

FIG. 4B shows an initial touch interaction at a different location. In particular, FIG. 4B shows finger 402 touching the touchpad 122 of HMD 120 at location B. Therefore, in the scenario shown in FIG. 4B, input regions 408 are centered around location B on touchpad 122.

In some embodiments, the first chord in a user's chord authorization sequence may be used to locate the input regions on the touch-based interface. In one such embodiment, on a device where three input regions are provided on an unlock screen, all chord authentication sequences may be required to start with the chord formed by touching all three input regions simultaneously. This chord may typically be entered with a multi-touch action that involves three fingers touching simultaneously. As such, the computing device can use the respective location of each finger to determine where to locate the input region that corresponds to that finger. Other techniques for using the first chord to locate the input regions, which may or may not require that the initial chord be formed by touching all three input regions simultaneously, are also possible.

Dynamically locating the input region based on an initial touch interaction may help a user to enter their chord authorization sequence more easily, especially in scenarios where the user cannot see the touch-based interface. Other benefits are possible as well. However, it should be understood that the possible benefits described herein should not be construed as limiting the scope of the invention.

In a further aspect, an exemplary method may be used to create and/or authenticate a sequence of chords in a manner that is scale and/or rotation invariant. In such an embodiment, a computing system may use the entire sequence of touches involved in the sequence of chords to determine the location of input regions. In particular, to create a chord authorization pattern, the computing device may first record a sequence of touches representing a sequence of cords. The computing system may then apply a clustering process to cluster individual touches in the sequence into chords by, for example, grouping touches that are detected close to one another in the sequence. In so doing, the clustering process may take into account various factors, and may incorporate any constraints on chord layout (e.g., a requirement that the chords in the chord authentication pattern be linear).

Once the computing system has clustered the touches into chords, the computing system may determine an order of the chords based on the respective position of each chord's centroid. The order may be arbitrary, but should be deterministic for any given sequence of chords that are generated in this manner. For example, the order may be determined by finding the best-fit line through the clusters, projecting each cluster onto the line, and then imposing a direction on the line that is based on the order in which centroids appear on the line.

Once the chords are determined and ordered, a user may be able to provide their chord authentication pattern by entering the same chords anywhere on the touchpad, at any orientation. In particular, when the user enters the same sequence of touches at any location and in any arrangement, the clustering and ordering process may be used to determine a sequence of chords from the sequence of touches. The determined sequences of chords may then be compared to the initially determined sequence of chords (i.e., the user-defined chord authentication pattern) in order to authenticate the user.

iii. Feedback Based on Touch Interaction with Input Regions

In a further aspect, an exemplary computing device may provide various types of feedback to assist a user in entering chords and/or to indicate whether are not chords have been correctly formed.

In some embodiments, a computing device may provide audio feedback based on touch interactions with the input regions on a touch-based interface. For example, a different audio tone may be associated with each input region. As such, a user may learn that certain tones and/or certain musical chords formed by combinations of tones correspond to entry of certain chords via the input regions on a touch-based interface.

In some embodiments, a computing device may include or be connected to a bone conduction speaker. For instance, an exemplary HMD may include a bone-conduction speaker that is arranged to be heard by the wearer when the HMD is worn. In such an embodiment, the audio feedback may be provided via the bone-conduction speaker.

As another example, a touch-based interface may be configured to provide a haptic feedback, variable-force vibration feedback, or another form of tactile feedback for each input region so that a user can feel a chord as they enter it on the touch-based interface. As yet another example, each input region may light up or graphically convey a touch in another manner so that the user can see when a given input region is touched.

And as yet another example, in the context of an HMD with a side-mounted touchpad, a graphic representation of the input regions may be displayed in the HMD. As such, visual feedback may be provided in the HMD to indicate when each input region is touched. For example, three input regions on a touchpad may be graphically represented as three adjacent rectangles in the HMD, which each light up whenever a user is touching the corresponding input region on the touchpad. Other examples are also possible.

iv. Visual Symbols to Prompt Chords

In some embodiments, a certain graphic symbol (e.g., images or graphic icons) may be used to visually represent each chord that can be formed in the input regions. For example, referring to FIG. 1C, an image of a lion might represent chord 152, an image of a hat might represent chord 154, an image of a toucan might represent chord 156, and an image of a soccer ball might represent chord 158 (with other images representing the other possible chords that are not shown in FIG. 1C). Many other examples are possible.

When chords are mapped to certain graphic symbols, a sequence of symbols may serve as a mnemonic to help users remember their chord sequence. For example, in a further aspect of an exemplary method, a computing device may prompt the user to enter the correct chords by displaying the corresponding graphic symbols. For example, an HMD may initially display the symbol corresponding to the first chord in the HMD's chord authorization sequence. Then, once the first chord has been correctly entered, the HMD may display the symbol corresponding to the second chord in the sequence, and so on, until the sequence has been correctly entered.

Alternatively, when a certain graphic symbol is associated with each chord in a user's authorization sequence, both the graphic symbol and the associated chord may be displayed. However, the graphic symbols and associated chords from the authorization sequence (i.e., correct symbol-chord pairs) may be mixed with graphic symbols and chords that are not part of the authorization sequence (i.e., incorrect symbol-chord pairs). By mixing the correct symbol-chord pairs with incorrect symbol-chord pairs, a user must remember at least the graphic symbols that correspond to their chord authorization sequence in order to unlock their device.

In some embodiments, each correct symbol-chord pair may be simultaneously displayed with a number of incorrect symbol chord pairs. For example, consider a scenario where a chord authorization sequence is three chords, and where there are three input regions for entering a chord; a left region, a middle region, and a right region, which are arranged linearly. A user might set their unlock code to be the following three chords: (i) all three regions, then (ii) only the middle region, and then (iii) only the left and right regions. Further, chord (i) may be associated with an image of a clock, chord (ii) may be associated with an image of a chair, and chord (iii) may be associated with an image of a dog.

When the user initiates an unlock process, the device may display the number of symbol-chord pairs, one of which is the image of the clock along with a graphic representation of the input regions with an indication that all three regions are selected (e.g., by displaying a dot in or highlighting each input region in the representation). The other incorrect symbol-chord pairs may also include a graphic representation of the input regions with an indication of other codes that are incorrect. Thus, if the user remembers that the image corresponding to the first chord is a clock, then the user can see that the first chord requires touching all three input regions, and may therefore enter the first chord. When the first chord is entered a new screen may be displayed that includes the second symbol-chord pair in the user's authorization sequence, as well as a number of incorrect symbol-chord pairs. As such, the user may remember that the image corresponding to the second image is chair, enter the corresponding chord that is displayed, and then do the same for the third chord, in order to successfully enter their code.

In a variation on the above embodiment, symbol-chord pairs may be displayed sequentially with the correct symbol-chord pairs mixed among incorrect symbol-chord pairs. Accordingly, the user may enter their chord authorization sequence by entering the chords displayed in association with the symbols that they recognize as corresponding to their authorization sequence, and ignoring the symbols that are not part of their authorization sequence.

In a further aspect, an exemplary device may allow a user to customize the symbolic representation of chords. For example, an exemplary device may allow a user to define which images are mapped to which chords, may allow a user may supply their own images to use as symbols, and/or may supply stock symbols that can be mapped to certain chords. As such, the user-interface that allows a user to define their chord authorization sequence, may also allow the user to specify which symbols are mapped to the chords in their authorization sequence. This may help to make the chord authorization sequence more secure, as allowing the user to define their own symbol-to-chord mapping means that the symbols that represent certain chords may vary from device to device.

Additionally or alternatively, the symbols may serve as feedback when a chord is entered. For example, whenever a given chord in a sequence is entered, the corresponding symbol may be displayed.

Further, in an embodiment where a chord is not entered until a user lifts all their fingers of the display, the image may update as the user changes the combination of input regions that are being touched (so long as at least one input region remains touched). This may help a user verify that they are about to enter the chord that they intend to, before they remove all their fingers to enter the chord.

B. Exemplary Chords

Figure 5A:
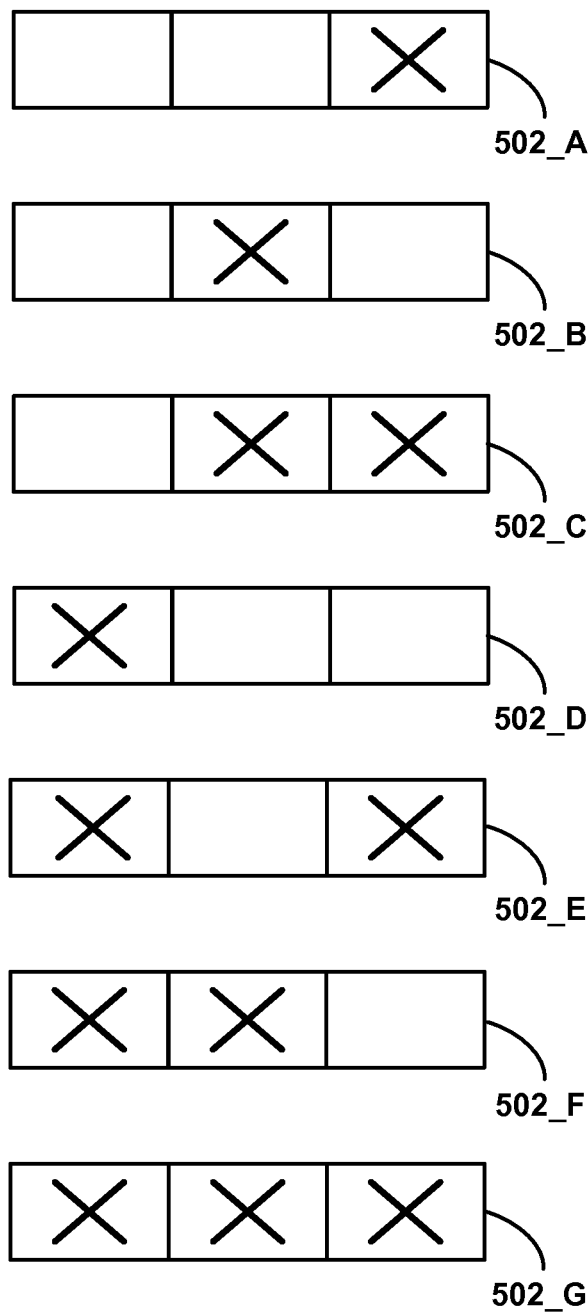
FIG. 5A illustrates the seven possible chords=on an exemplary arrangement of three input regions.

The number of chords that can be entered will typically vary according to the number of input regions. For example, with three input regions there are seven possible chords that can be entered in which at least one input region is touched. From a signal-processing perspective, each input region may provide a touch indication. The touch indication may be a binary signal indicating either (a) that the given input region is being touched or (b) that the given input region is not being touched. For simplicity, this binary signal may be thought of as being equal to "1" when the input region is being touched, and equal to "0" when it is not being touched. Therefore, in an embodiment with three input regions, the set of seven possible chords may be represented as: {001, 010, 011, 100, 101, 110, 111}. FIG. 5A illustrates the seven possible chords 502_A to 502_G on an exemplary arrangement of three input regions.

Figure 5B:
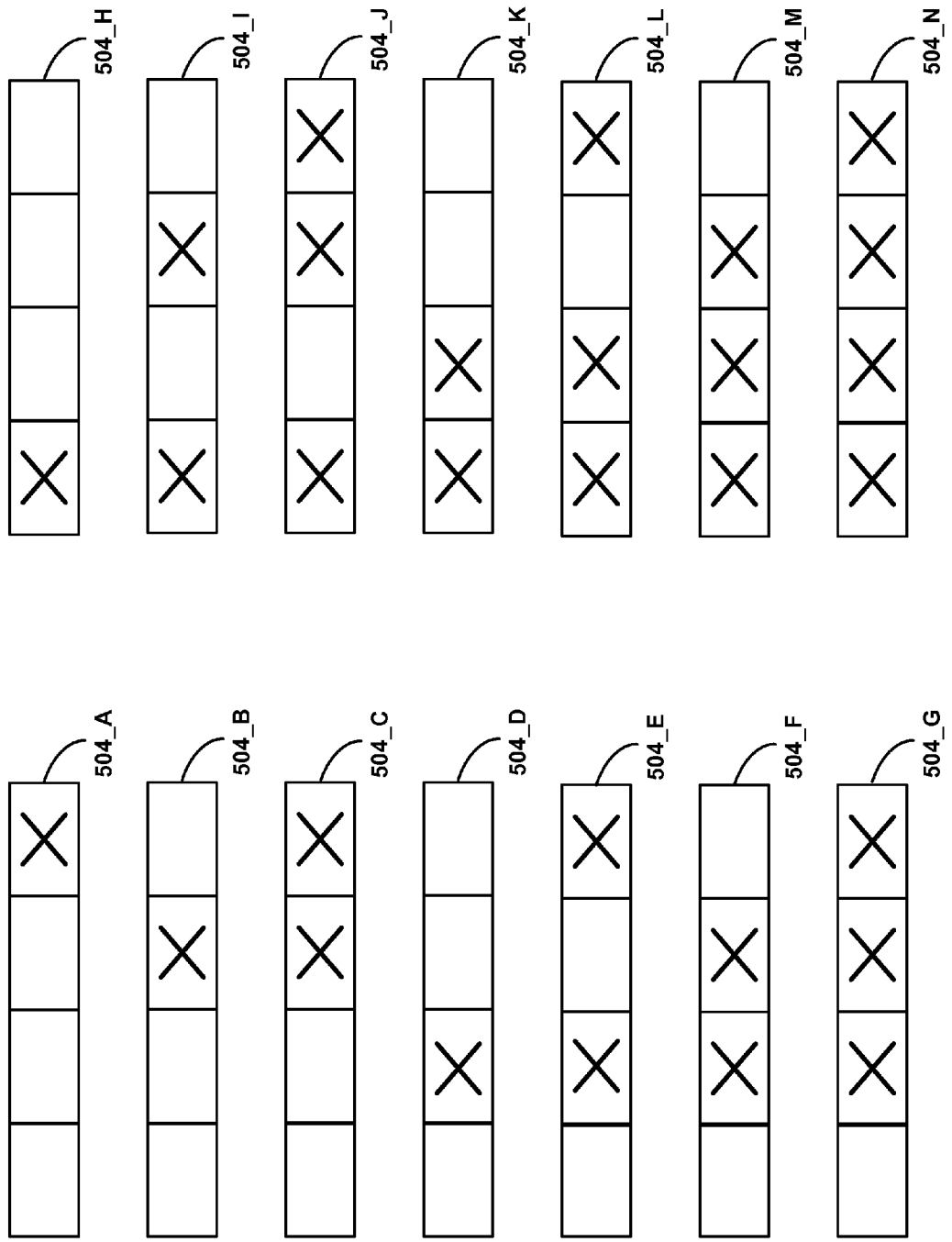
FIG. 5B illustrates the fifteen possible chords on an exemplary arrangement of four input regions.

As another example, with four input regions, there are fifteen possible chords that can be entered in which at least one input region is touched. Thinking again of the touch indication from each input region as a binary signal that is equal to "1" when the input region is being touched, and is equal to "0" when it is not being touched, in an embodiment with four input regions, the set of fifteen possible chords may be represented as: {0001, 0010, 0011, 0100, 0101, 0110, 0111, 1000, 1001, 1010, 1011, 1100, 1101, 1110, 1111}. FIG. 5B illustrates the fifteen possible chords 504_A to 504_N on an exemplary arrangement of four input regions.

An exemplary computing device may use various techniques to determine when a chord should be considered to be complete. For instance, in some embodiments, a computing device may conclude that a chord has been completely entered whenever the user lifts any finger from the touch-based interface. In particular, computing device may register the chord as the chord corresponding to the input region or regions that were touched just before the user ceases to touch one or more of the input regions. This technique may allow a user to more easily enter chords, as the user need not lift all fingers quickly at once (an action that might be more difficult for the computing device to detect, as well as more difficult for the user to perform).

Additionally or alternatively, after the computing device determines that a chord has been entered, a computing device may wait for all fingers to be removed from the touch-based surface, or in other words, may wait until it detects that none of the input regions are being touched, before the device begins listening for a next chord. Waiting for all fingers to be lifted before listening for the next chord may help to prevent unintended chord entry from occurring as the user lifts subsequent fingers prior to entering the next chord.

Further, waiting for all fingers to be lifted before listening for the next chord may help to avoid a "race condition" where a user would need to touch all input regions in a chord simultaneously, and multiple fingers touching at slightly different times could therefore lead to chord-entry errors. For example, referring to FIG. 1A, a user could enter a chord {101}, by either touching input region 104_A or 104_C first, and then touching either 104_C or 104_A, respectively. Alternatively, it is possible that simultaneous or substantially simultaneous touching of all input regions in a chord may be required.

Furthermore, the above is but one example of how touch interactions with the input regions may be interpreted as a sequence of chords. However, other techniques for interpreting touch interactions with the input regions as chords are also possible.

C. Exemplary Chord Authentication Sequences

The number of chords included in a chord authentication sequence may vary. In some embodiments, the number of chords may be based on a user-defined setting, corporate security policies, and/or other factors.

In one exemplary embodiment, each chord authentication sequence may include four chords, which may be entered via three input regions. With four chords and three input regions, there are 2401 possible chord authentication sequences.

Further, if increased security is desired, a computing device may increase the number of chords and/or the number of input regions. For example, if five chords are required and three input regions are provided for chord entry, then there are 16,807 possible chord authentication sequences. Other examples are also possible.

In a further aspect, an exemplary computing device may allow a user to set the sequence of chords that make up the user's chord authentication sequence. In addition, an exemplary computing device may allow a user to set certain parameters of the chord authentication sequence required for the device, such as the number of input regions used, the arrangement of the input regions, the number of chords required for a chord authentication sequence, etc.

D. Timeout/Clearing Partial Chord-Entry

In a further aspect, a computing device may be configured to clear all entered chords if a predetermined period of time passes with no further interaction with the input regions. Further, in the above-described embodiment where the initial chord in the authentication sequence is formed by touching all three input regions, a timeout mechanism may help to avoid getting out of phase by accidentally touching the touchpad. In particular, if the computing device starts a timer when it determines that all three input regions are being touched, and then clears the currently registered portion of the chord sequence if another chord input is not received within a certain period of time, this may also help to avoid false positives.

In a further aspect, entered chords from a fully-entered sequence of chords may also be cleared if the sequence is incorrect (e.g., if the sequence does not match a predetermined chord authentication pattern). Furthermore, various forms of feedback may be provided to indicate that authentication failed. Yet further, the user may be prompted to re-enter their chord authentication pattern and/or provided with options for seeking assistance in obtaining and/or resetting their chord authentication pattern.

In a further aspect, an exemplary computing device may allow a user to clear with a certain touch-based interaction. For example, a computing device may clear a partially entered sequence of chords when it detects a swipe across the touch-based interface, or another type of touch interaction that is mapped to a "start over" function.

E. Combination of Chords with Other Authentication Techniques

In a further aspect, an exemplary method may incorporate a predetermined chord authorization pattern in combination with some other form of authentication for purposes of authorizing a user. For example, a text-based password, numeric password, or touch-pattern password may be required before or after entry of a chord authorization pattern. As another example, the presence of a certain radio-frequency ID (RFID) tag, such as a near-field communications (NFC) tag, for example, may be required when a chord authorization pattern is entered. Further, authentication via retinal scanning, fingerprint recognition, and/or other techniques may also be implemented in conjunction with a chord authorization pattern.

As a specific example, a mobile phone may be equipped with an RFID or NFC chipset that can be used to authenticate the mobile phone. A bank account of the mobile phone's user may then be associated with the NFC tag of the mobile phone. Accordingly, when the user goes to use an ATM to withdraw money, the mobile phone may first broadcast an NFC tag in order to cause the ATM machine to establish communications with the mobile phone. Then once the mobile phone has established a connection with the ATM machine, it may present the user with a GUI for entering a chord authorization pattern on the mobile phone. If the correct chord authorization pattern is provided, then the mobile phone may present an interface and allow the user to interact with the ATM to, for example, withdraw or transfer money from the user's bank account. Many other examples are possible as well.

F. Chord-Based Authentication Via a Non-Touch-Based Interface

In an alternative embodiment, a chord authorization pattern may be entered in a similar manner on a wearable computer as described above, without the user actually contacting the touch-based interface. For example, a wearable computer could use a camera, a laser, and/or ultrasound or proximity sensors to capture chords made by holding fingers up. For instance, the wearer could hold the pointer, middle, and ring fingers up in front of a camera to enter the equivalent chord to that illustrated by chord 502_G, could hold up just the pointer and ring fingers to enter the equivalent chord to that illustrated by chord 502_E, and so on. Other examples are also possible.

G. Chord Entry on Touch-Pad with Edge-Touch Functionality

In some instances, an exemplary method may be implemented by a computing device with a touch-based interface that is configured to receive input via edge-touch interactions. For example, referring to FIG. 1B, HMD 120 may be configured to detect: (a) touch interactions on the primary surface of touchpad 122 on which input regions 104_A to 104_C are shown and (b) edge-touch interactions on the top and/or bottom edge of touchpad 122. Note that an edge-touch interaction may generally be any touch interaction on a surface of a touchpad other than the primary surface for touch interactions.

In such an embodiment, edge-touch interactions may be used to form chords. Further, to facilitate chording with edge-touch interactions, one or more of the input regions may be located on an edge of a touchpad.

Many types of chords may be formed when edge-touch interactions are incorporated. For example, on a side-mounted touchpad such as touchpad 122, a set of four input regions might be defined with a single input region on the bottom edge of touchpad 122 (where a user might typically place their thumb), and three input regions on the top edge of touchpad 122 (where a user might typically place their pointer, middle, and ring fingers). Accordingly, the user may grip the touchpad with opposing fingers when entering a chord authorization sequence.

In some embodiments, input regions may additionally or alternatively be defined on other edges of the touchpad 122, such as the edge that is proximate to lens 124 and/or the edge that is distal from lens 124. Furthermore, in some embodiments, input regions may be defined on both the primary surface of touchpad 122 and one or more of the edges of touchpad 122.

Figure 9A:
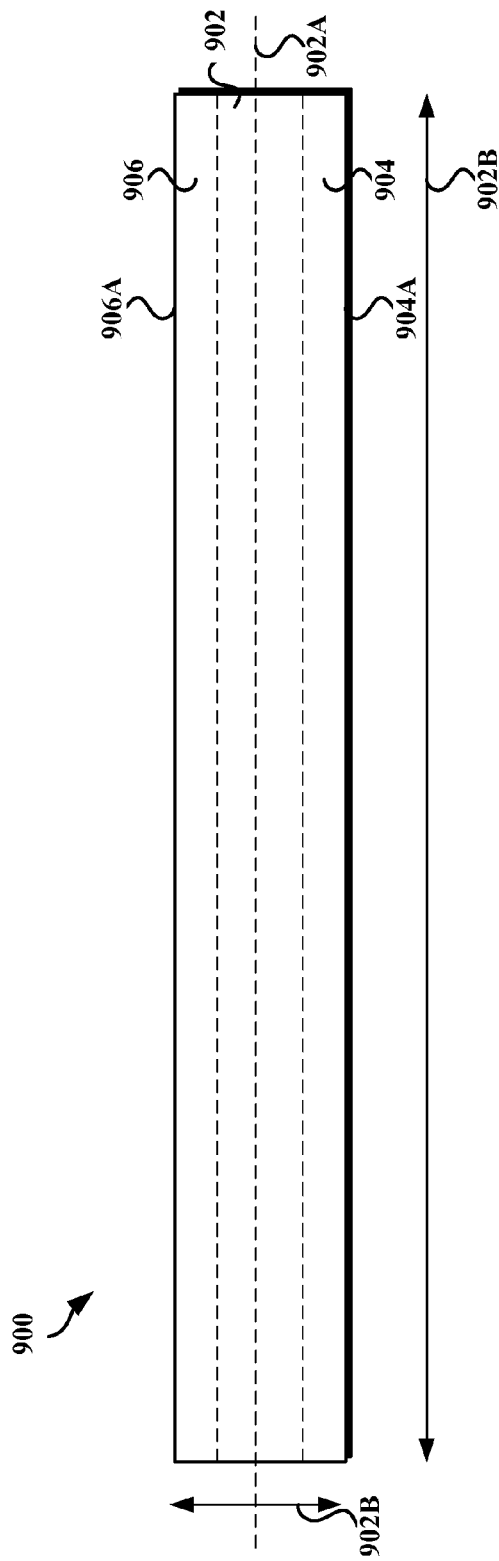
FIG. 9A shows a touchpad that is configured for edge-touch functionality, according to an exemplary embodiment.
Figure 9B:
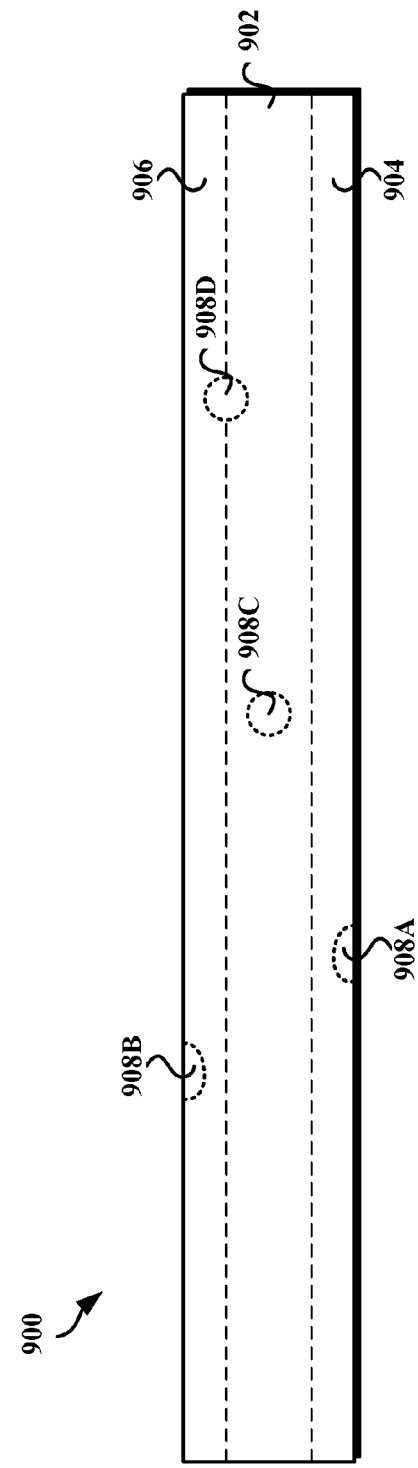
FIG. 9B shows another configuration of the touchpad shown in FIG. 9A.

Note that exemplary touchpads configured for edge-touch interactions are described in reference to FIGS. 9A to 9b.

Exemplary Wearable Computing Device Architecture

Exemplary systems and devices in which exemplary embodiments may be implemented will now be described in greater detail. As noted, an exemplary system may be implemented in or may take the form of a wearable computer. However, an exemplary system may also be implemented in or take the form of other devices, such as a mobile phone, among others. Further, an exemplary system may take the form of non-transitory computer readable medium, which has program instructions stored thereon that are executable by at a processor to provide the functionality described herein. An exemplary, system may also take the form of a device such as a wearable computer or mobile phone, or a subsystem of such a device, which includes such a non-transitory computer readable medium having such program instructions stored thereon to provide the authentication functionality described herein.

Figure 6A:
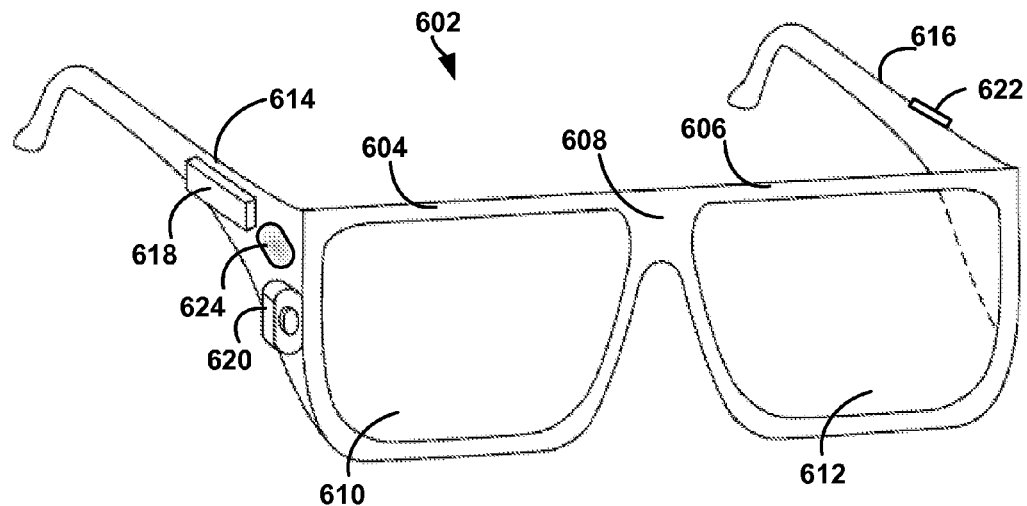
FIG. 6A illustrates a wearable computing system according to an exemplary embodiment.

FIG. 6A illustrates a wearable computing system according to an exemplary embodiment. In FIG. 6A, the wearable computing system takes the form of a head-mounted device (HMD) 602 (which may also be referred to as a head-mounted display). It should be understood, however, that exemplary systems and devices may take the form of or be implemented within or in association with other types of devices, without departing from the scope of the invention. As illustrated in FIG. 6A, the head-mounted device 602 comprises frame elements including lens-frames 604, 606 and a center frame support 608, lens elements 610, 612, and extending side-arms 614, 616. The center frame support 608 and the extending side-arms 614, 616 are configured to secure the head-mounted device 602 to a user's face via a user's nose and ears, respectively.

Each of the frame elements 604, 606, and 608 and the extending side-arms 614, 616 may be formed of a solid structure of plastic and/or metal, or may be formed of a hollow structure of similar material so as to allow wiring and component interconnects to be internally routed through the head-mounted device 602. Other materials may be possible as well.

One or more of each of the lens elements 610, 612 may be formed of any material that can suitably display a projected image or graphic. Each of the lens elements 610, 612 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 614, 616 may each be projections that extend away from the lens-frames 604, 606, respectively, and may be positioned behind a user's ears to secure the head-mounted device 602 to the user. The extending side-arms 614, 616 may further secure the head-mounted device 602 to the user by extending around a rear portion of the user's head. Additionally or alternatively, for example, the HMD 602 may connect to or be affixed within a head-mounted helmet structure. Other possibilities exist as well.

The HMD 602 may also include an on-board computing system 618, a video camera 620, a sensor 622, and a finger-operable touch pad 624. The on-board computing system 618 is shown to be positioned on the extending side-arm 614 of the head-mounted device 602; however, the on-board computing system 618 may be provided on other parts of the head-mounted device 602 or may be positioned remote from the head-mounted device 602 (e.g., the on-board computing system 618 could be wire- or wirelessly-connected to the head-mounted device 602). The on-board computing system 618 may include a processor and memory, for example. The on-board computing system 618 may be configured to receive and analyze data from the video camera 620 and the finger-operable touch pad 624 (and possibly from other sensory devices, user interfaces, or both) and generate images for output by the lens elements 610 and 612.

In some embodiments, the touch pad 624 may include physical features such as indentations or extrusions (not shown). Such features may help to guide a wearer's fingers to the correct location for entry of a chord authorization pattern.

The video camera 620 is shown positioned on the extending side-arm 614 of the head-mounted device 602; however, the video camera 620 may be provided on other parts of the head-mounted device 602. The video camera 620 may be configured to capture images at various resolutions or at different frame rates. Many video cameras with a small form-factor, such as those used in cell phones or webcams, for example, may be incorporated into an example of the HMD 602.

Further, although FIG. 6A illustrates one video camera 620, more video cameras may be used, and each may be configured to capture the same view, or to capture different views. For example, the video camera 620 may be forward facing to capture at least a portion of the real-world view perceived by the user. This forward facing image captured by the video camera 620 may then be used to generate an augmented reality where computer generated images appear to interact with the real-world view perceived by the user.

The sensor 622 is shown on the extending side-arm 616 of the head-mounted device 602; however, the sensor 622 may be positioned on other parts of the head-mounted device 602. The sensor 622 may include one or more of a gyroscope or an accelerometer, for example. Other sensing devices may be included within, or in addition to, the sensor 622 or other sensing functions may be performed by the sensor 622.

The finger-operable touch pad 624 is shown on the extending side-arm 614 of the head-mounted device 602. However, the finger-operable touch pad 624 may be positioned on other parts of the head-mounted device 602. Also, more than one finger-operable touch pad may be present on the head-mounted device 602. The finger-operable touch pad 624 may be used by a user to input commands. The finger-operable touch pad 624 may sense at least one of a position and a movement of a finger via capacitive sensing, resistance sensing, or a surface acoustic wave process, among other possibilities. The finger-operable touch pad 624 may be capable of sensing finger movement in a direction parallel or planar to the pad surface, in a direction normal to the pad surface, or both, and may also be capable of sensing a level of pressure applied to the pad surface. The finger-operable touch pad 624 may be formed of one or more translucent or transparent insulating layers and one or more translucent or transparent conducting layers. Edges of the finger-operable touch pad 624 may be formed to have a raised, indented, or roughened surface, so as to provide tactile feedback to a user when the user's finger reaches the edge, or other area, of the finger-operable touch pad 624. If more than one finger-operable touch pad is present, each finger-operable touch pad may be operated independently, and may provide a different function.

Figure 6B:
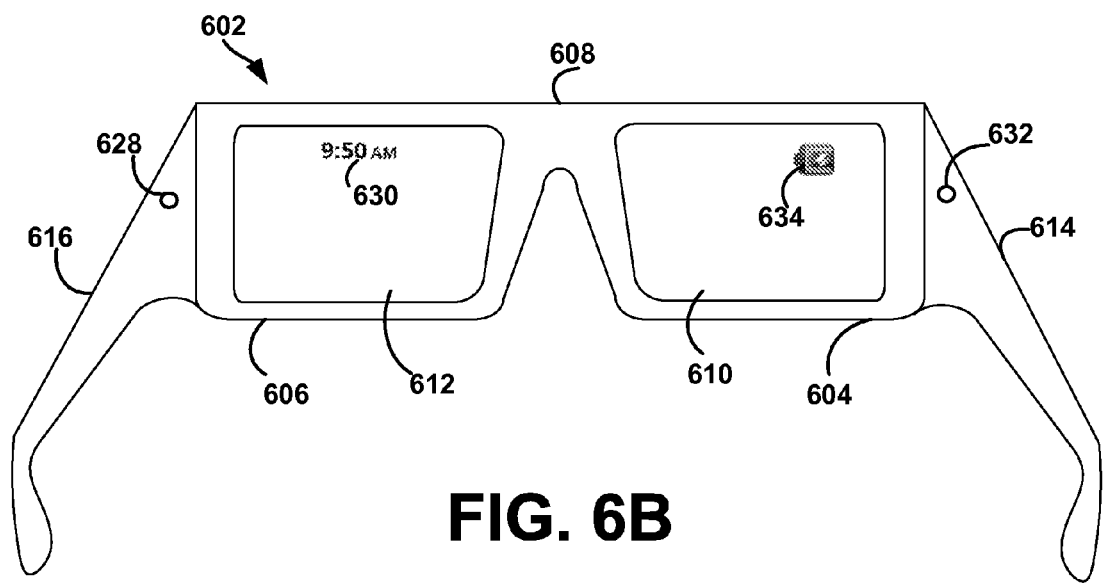
FIG. 6B illustrates an alternate view of the wearable computing device illustrated in FIG. 5A.

FIG. 6B illustrates an alternate view of the wearable computing device illustrated in FIG. 6A. As shown in FIG. 6B, the lens elements 610, 612 may act as display elements. The head-mounted device 602 may include a first projector 628 coupled to an inside surface of the extending side-arm 616 and configured to project a display 630 onto an inside surface of the lens element 612. Additionally or alternatively, a second projector 632 may be coupled to an inside surface of the extending side-arm 614 and configured to project a display 634 onto an inside surface of the lens element 610.

The lens elements 610, 612 may act as a combiner in a light projection system and may include a coating that reflects the light projected onto them from the projectors 628, 632. In some embodiments, a reflective coating may not be used (e.g., when the projectors 628, 632 are scanning laser devices).

In alternative embodiments, other types of display elements may also be used. For example, the lens elements 610, 612 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 604, 606 for driving such a matrix display. Alternatively or additionally, a laser or LED source and scanning system could be used to draw a raster display directly onto the retina of one or more of the user's eyes. Other possibilities exist as well.

Figure 7A:
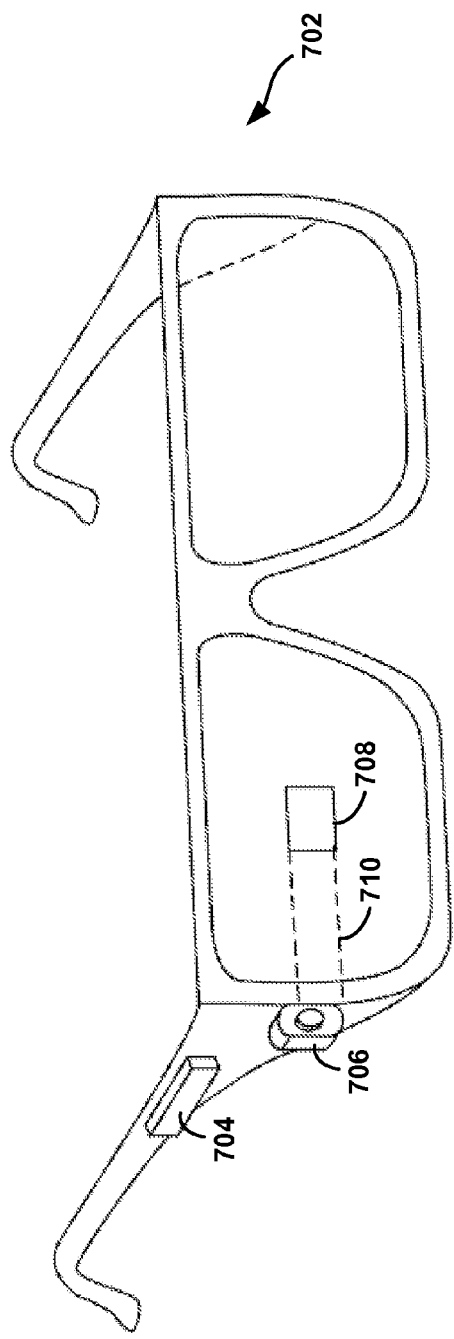
FIG. 7A illustrates another wearable computing system according to an exemplary embodiment, which takes the form of an HMD.

FIG. 7A illustrates another wearable computing system according to an exemplary embodiment, which takes the form of an HMD. The HMD 702 may include frame elements and side-arms such as those described with respect to FIGS. 6A and 6B. The HMD 702 may additionally include an on-board computing system 704 and a video camera 706, such as those described with respect to FIGS. 6A and 6B. The video camera 706 is shown mounted on a frame of the HMD 702. However, the video camera 706 may be mounted at other positions as well.

As shown in FIG. 7A, the HMD 702 may include a single display 708 which may be coupled to the device. The display 708 may be formed on one of the lens elements of the HMD 702, such as a lens element described with respect to FIGS. 6A and 6B, and may be configured to overlay computer-generated graphics in the user's view of the physical world. The display 708 is shown to be provided in a center of a lens of the HMD 702, however, the display 708 may be provided in other positions. The display 708 is controllable via the computing system 704 that is coupled to the display 708 via an optical waveguide 710.

Figure 7B:
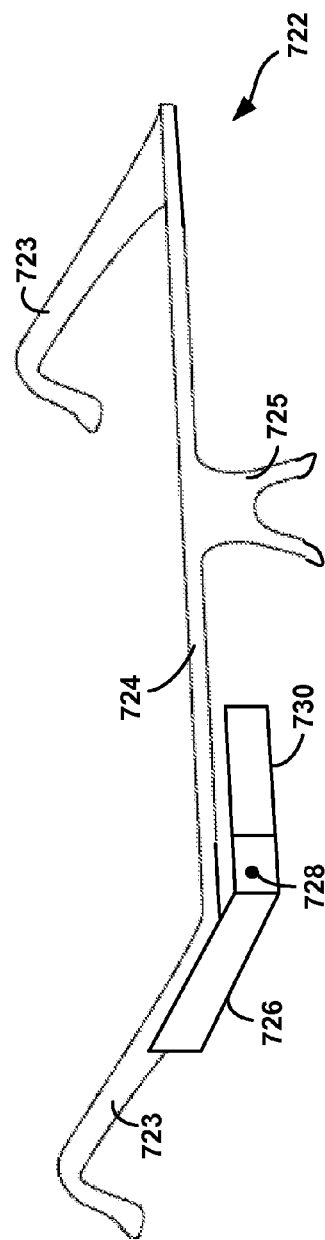
FIG. 7B illustrates another wearable computing system according to an exemplary embodiment, which takes the form of an HMD.

FIG. 7B illustrates another wearable computing system according to an exemplary embodiment, which takes the form of an HMD. The HMD 722 may include side-arms 723, a center frame support 724, and a bridge portion with nosepiece 725. In the example shown in FIG. 7B, the center frame support 724 connects the side-arms 723. The HMD 722 does not include lens-frames containing lens elements. The HMD 722 may additionally include an on-board computing system 726 and a video camera 728, such as those described with respect to FIGS. 6A and 6B.

The HMD 722 may include a single lens element 730 that may be coupled to one of the side-arms 723 or the center frame support 724. The lens element 730 may include a display such as the display described with reference to FIGS. 6A and 6B, and may be configured to overlay computer-generated graphics upon the user's view of the physical world. In one example, the single lens element 730 may be coupled to the inner side (i.e., the side exposed to a portion of a user's head when worn by the user) of the extending side-arm 723. The single lens element 730 may be positioned in front of or proximate to a user's eye when the HMD 722 is worn by a user. For example, the single lens element 730 may be positioned below the center frame support 724, as shown in FIG. 7B.

FIG. 8 illustrates a schematic drawing of a computing device according to an exemplary embodiment. In system 800, a device 810 communicates using a communication link 820 (e.g., a wired or wireless connection) to a remote device 830. The device 810 may be any type of device that can receive data and display information corresponding to or associated with the data. For example, the device 810 may be a heads-up display system, such as the head-mounted devices 602, 702, or 722 described with reference to FIGS. 6A, 6B, 7A, and 7B.

Thus, the device 810 may include a display system 812 comprising a processor 814 and a display 816. The display 810 may be, for example, an optical see-through display, an optical see-around display, or a video see-through display. The processor 814 may receive data from the remote device 830, and configure the data for display on the display 816. The processor 814 may be any type of processor, such as a micro-processor or a digital signal processor, for example.

The device 810 may further include on-board data storage, such as memory 818 coupled to the processor 814. The memory 818 may store software that can be accessed and executed by the processor 814, for example.

The remote device 830 may be any type of computing device or transmitter including a laptop computer, a mobile telephone, or tablet computing device, etc., that is configured to transmit data to the device 810. The remote device 830 and the device 810 may contain hardware to enable the communication link 820, such as processors, transmitters, receivers, antennas, etc. The remote device 830 may take other forms as well.

In FIG. 8, the communication link 820 is illustrated as a wireless connection; however, wired connections may also be used. For example, communication link 820 may be a wired serial bus such as a universal serial bus or a parallel bus. A wired connection may be a proprietary connection as well. The communication link 820 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 830 may be accessible via the Internet and may include a computing cluster associated with a particular web service (e.g., social-networking, photo sharing, address book, etc.).

FIG. 9A shows a touchpad that is configured for edge-touch functionality, according to an exemplary embodiment. It should be understood, however, that example touchpad 900 is shown for purposes of example and explanation only, and should not be taken to be limiting.

Example touchpad 900 may be generally arranged as a "linear trackpad." That is, touchpad 900 generally includes a flat surface 902, having a longitudinal axis 902A. In other words, the width of surface 902 of touchpad 900 is of length 902B that is greater than the height of length 902C. While the methods disclosed herein may be utilized on such a linear trackpad, it should be understood that trackpads of other form factors, or other dimensions, may be used as well.

Touchpad 900 may include various input areas. As will be discussed further below, the computing system may be configured to interpret, or otherwise perceive, user inputs in differing input areas in different manners. As shown in FIG. 9A, touchpad 900 may include first input area 904 on surface 902 of touchpad 900 adjacent to first longitudinal edge 904A of touchpad 900. Further, touchpad 900 may include second input area 906 on surface 902 of touchpad 900 adjacent to second longitudinal edge 906A of touchpad 900.

With reference to FIG. 9B, touchpad 900 may be configured to receive touch-based user inputs at a variety of locations (including, perhaps, any location) on surface 902. For example, touchpad 900 may be configured to receive user inputs, such as touch inputs 908A and 908B, which are entirely within one of input areas 904 and 906, respectively. As discussed further below, such user inputs that are entirely contained in one of input areas 904 and/or 906 may indicate an incidental user input resulting from the user touching an edge (e.g., either a bottom or top edge, respectively) of touchpad 900.

FIG. 9B shows another configuration of the touchpad shown in FIG. 9A. In particular, touchpad 900 may be configured to receive user inputs, such as touch input 908C, that are not within either of input areas 904 and 906. As yet another example, touchpad 900 may be configured to receive user inputs, such as touch input 908D, which are partially within either of one of input areas 904 and/or 906. Other examples of touch-based user inputs may exist as well.

Further, an example computing system may be configured to detect when a user is touching an edge 904A or 906A. In some embodiments, rather than directly detecting a touch on an edge 904A or 906A, the computing system may interpret an "incidental touch" on surface 902 as a touch on an edge 904A or 906A. In general, an incidental touch should be understood to be a touch that occurs without intention of the user or a touch that occurs as an understood consequence of an action with a different primary intent. For example, an exemplary computing system may take advantage of the fact that when a user touches an edge 904A or 906A, skin may wrap around (or otherwise incidentally contact) surface 902. Thus, in order to allow for edge-based touch interactions, the computing system may interpret an incidental touch on surface 902 that is near an edge 904A or 906A as a touch on edge 904A or 906A, respectively.

Further, to facilitate edge-touch functionality, the computing system may be configured to distinguish between an incidental touch and a direct or intentional touch on surface 902. Configured as such, the computing system may allow a user to provide touch input by touching the edges 904A and 906A, and by touching surface 902.

Figure 9C:
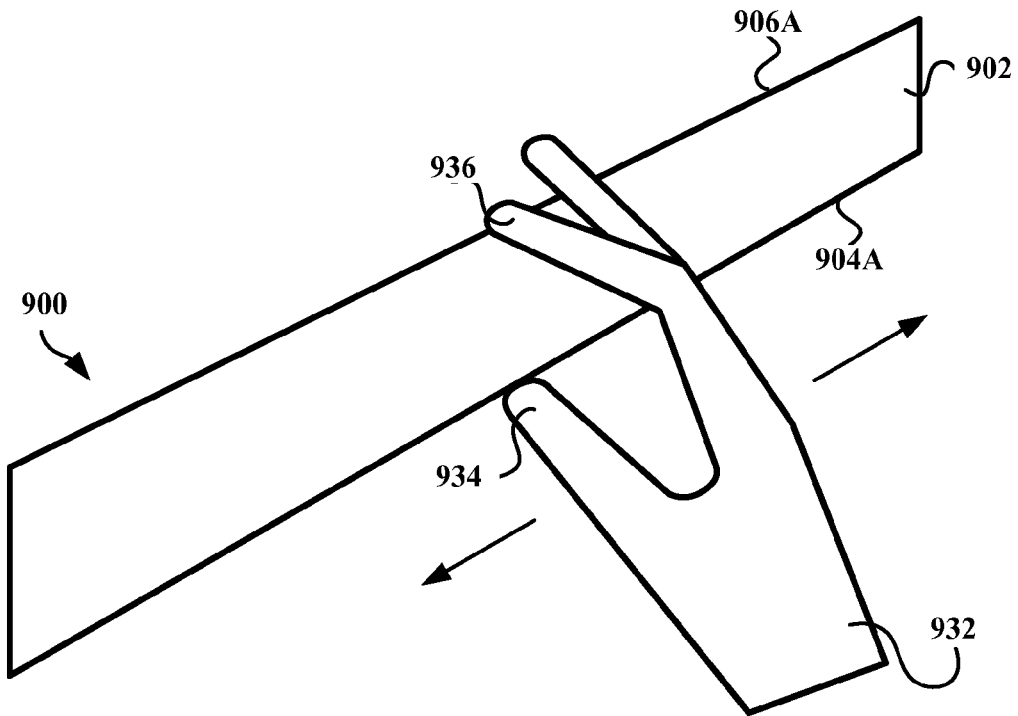
FIGS. 9C and 9D illustrate edge-touch interactions, according to an exemplary embodiment.
Figure 9D:
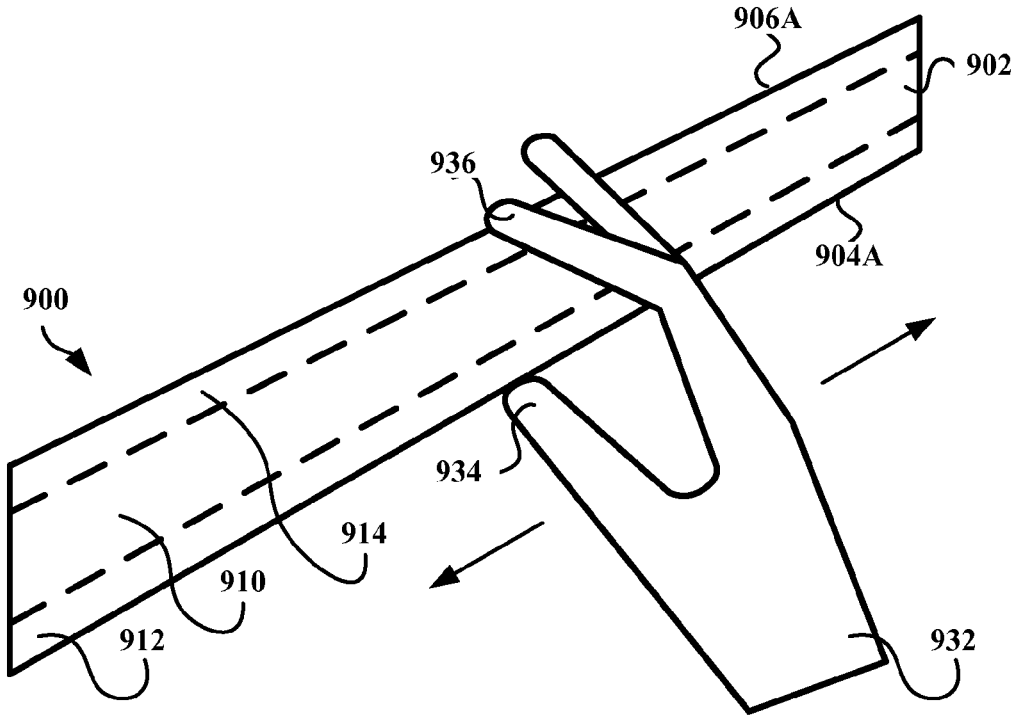

FIGS. 9C and 9D illustrate edge-touch interactions, according to an exemplary embodiment. With reference to FIG. 9C, an edge-touch interaction may be performed by a pointer finger 936 of a user's hand 932. While pointer finger 936 is shown as touching first longitudinal edge 906A, surface 902 may be configured to detect incidental contact of pointer finger 936 against surface 902 as a result of pointer finger 936 touching edge 906A. That is, when pointer finger 936 presses against edge 906A, a portion of the user's thumb skin may wrap around (or otherwise incidentally contact) surface 902 of touchpad 900.

With respect to FIG. 9D, first input area 912 and second input area 914 may be utilized by touchpad 900 to help distinguish between non-incidental touches on surface 902 and incidental touches along edge 904A and 906A, respectively. For example, the size of first input area 912 may be set to a size (perhaps a relatively small size) such that if an input touch occurs entirely within input area 912, it may reasonably be assumed that the input touch is an incidental touch resulting from a user placing thumb 934 on edge 904A. Similarly, the size of second input area 914 may be set to a size (perhaps a relatively small size) such that if an input touch occurs entirely within input area 914, it may reasonably be assumed that the input touch is an incidental touch resulting from a user placing pointer finger 936 on edge 906A. Other techniques for recognizing incidental touches may exist as well.

In a further aspect, touchpad 900 may be configured to detect multiple edge-touch interactions concurrently. Furthermore, multiple edge-touch interactions may be concurrently detected on the same edge or on different edges. For example, at the time the user brings pointer finger 936 in contact with edge 906A, the user may also have thumb 934 in contact with edge 904A. Other examples are also possible.

CONCLUSION

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

Note that the description herein includes references to "wearable computing devices" and "wearable computers." Unless otherwise stated, these terms should be understood to be interchangeable.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method comprising:
providing a user-interface on a touch-based interface of a computing device, wherein the user-interface comprises a plurality of input regions;
receiving input data corresponding to a plurality of touch interactions on the touch-based interface, wherein each touch interaction is detected upon receipt of input data corresponding to removal of at least one finger from the touch-based interface;
determining a sequence of chords from the input data, wherein each chord is defined by a touch interaction with a certain combination of one or more of the input regions, wherein at least one chord in the sequence is defined by a touch interaction that comprises touch input at two or more input regions at substantially the same time;
determining that the sequence of chords substantially matches a predetermined chord authentication sequence; and
responsive to the match, causing a computing device to make at least one function accessible.

2. The method of claim 1, wherein the plurality of input regions comprises three horizontally-arranged input regions.

3. The method of claim 1, wherein the method further comprises:
initially detecting a first touch interaction at a first location on the touch-based interface; and
using the first location as a basis for determining a display location for the user-interface on the touch-based interface, wherein the user-interface is provided on the touch-based interface at the display location.

4. The method of claim 3, wherein the first touch interaction is a first chord from the predetermined chord authentication sequence.

5. The method of claim 4, wherein the first chord from the predetermined chord authentication sequence comprises touch interaction with all of the input regions.

6. The method of claim 1, further comprising providing feedback corresponding to the sequence of chords.

7. The method of claim 1, wherein the method is carried out by a wearable computing device comprising a head-mounted display (HMD), wherein the HMD comprises a side-mounted touchpad interface.

8. The method of claim 7, wherein the method further comprising:
   causing the HMD to display a graphic representation of each of the input regions in the HMD, wherein each graphic representation indicates in real-time whether or not a touch interaction is detected in the corresponding input region of the touch-based interface.

9. The method of claim 1, wherein determining the sequence of chords from the input data comprises determining each chord in the sequence by:
   determining from the input data a touch indication that indicates that a touch interaction is occurring in a first input region;
   subsequently detecting from the input data that a touch indication that indicates that a touch interaction that was occurring in a given input region is no longer occurring in the given input region; and
   defining the chord based on the touch indication that indicates that the touch interaction is occurring in a first input region and the touch indications for the other input regions immediately prior to detecting the touch indication that indicates that the touch interaction that was occurring in a given input region is no longer occurring.

10. The method of claim 9, wherein the method further comprises:
    after defining a given chord in the sequence of chords, waiting for touch indications from all of the input regions to indicate that no touch interaction is occurring before determining a next chord in the sequence.

11. The method of claim 1, wherein the method is carried out by a wearable computing device, and wherein causing the computing device to make at least one function accessible comprising the wearable computing device unlocking itself.

12. The method of claim 1, wherein the touch interactions comprise one or more edge-touch interactions.

13. A wearable-computing-device system comprising:
    a non-transitory computer-readable medium; and
    program instructions stored in the non-transitory computer-readable medium and executable by at least one processor to:
    provide a user-interface on a touch-based interface, wherein the user-interface comprises a plurality of input regions;
    receive input data that corresponds to a plurality of touch interactions on the touch-based interface, wherein each touch interaction is detected upon receipt of input data corresponding to removal of at least one finger from the touch-based interface;
    determine a sequence of chords from the input data, wherein each chord is defined by a touch interaction with a certain combination of one or more of the input regions, and wherein at least one chord in the sequence is defined by a touch interaction that comprises touch input at two or more input regions at substantially the same time;
    determine that the sequence of chords substantially matches a predetermined chord authentication sequence; and
    responsive to the match, cause a computing device to make at least one function accessible.

14. The system of claim 3, further comprising program instructions stored in the non-transitory computer-readable medium and executable by at least one processor to:
    initially detect a first touch interaction at a first location on the touch-based interface; and
    use the first location as a basis for determining a display location for the user-interface on the touch-based interface, wherein the user-interface is provided on the touch-based interface at the display location.

15. The system of claim 14, wherein the first touch interaction is a first chord from the predetermined chord authentication sequence.

16. The system of claim 13, further comprising program instructions stored in the non-transitory computer-readable medium and executable by at least one processor to provide feedback corresponding to the sequence of chords.

17. The system of claim 13, wherein the system is implemented in a wearable computing device comprising a head-mounted display (HMD), wherein the HMD comprises a side-mounted touchpad interface.

18. The system of claim 17, further comprising program instructions stored in the non-transitory computer-readable medium and executable by at least one processor to:
    cause the HMD to display a graphic representation of each of the input regions in the HMD, wherein each graphic representation indicates in real-time whether or not a touch interaction is detected in the corresponding input region of the touch-based interface.

19. The system of claim 13, wherein the program instructions stored in the non-transitory computer-readable medium and executable by at least one processor to determine the sequence of chords from the input data comprises program instructions stored in the non-transitory computer-readable medium and executable by at least one processor to:
    determine from the input data a touch indication that indicates that a touch interaction is occurring in a first input region;
    subsequently detect from the input data that a touch indication that indicates that a touch interaction that was occurring in a given input region is no longer occurring in the given input region; and
    define the chord based on the touch indication that indicates that the touch interaction is occurring in a first input region and the touch indications for the other input regions immediately prior to detecting the touch indication that indicates that the touch interaction that was occurring in a given input region is no longer occurring.

20. The system of claim 19, further comprising program instructions stored in the non-transitory computer-readable medium and executable by at least one processor to:
    after defining a given chord in the sequence of chords, wait for touch indications from all of the input regions to indicate that no touch interaction is occurring before determining a next chord in the sequence.

21. A system comprising:
    means for providing a user-interface on a touch-based interface, wherein the user-interface comprises a plurality of input regions;
    means for receiving input data corresponding to a plurality of touch interactions on the touch-based interface wherein at least one chord in the sequence is defined by a touch interaction with two or more input regions at substantially the same time;
    means for determining a sequence of chords from the input data, wherein each chord is defined by a touch interaction with a certain combination of one or more of the input regions, and wherein at least one chord in the sequence is defined by a touch interaction that comprises touch input at two or more input regions at substantially the same time;

means for determining that the sequence of chords substantially matches a predetermined chord authentication sequence; and means for responsive to the match, causing a computing device to make at least one function accessible.

* * * * *